US011227397B2

(12) United States Patent
Delbruck et al.

(10) Patent No.: US 11,227,397 B2
(45) Date of Patent: Jan. 18, 2022

(54) BLOCK-MATCHING OPTICAL FLOW AND STEREO VISION FOR DYNAMIC VISION SENSORS

(71) Applicant: UNIVERSITÄT ZÜRICH, Zürich (CH)

(72) Inventors: Tobias Delbruck, Zürich (CH); Min Liu, Zürich (CH)

(73) Assignee: UNIVERSITÄT ZÜRICH, Zürich (CH)

(*) Notice: Subject to any disclaimer, the term of this patent is extended or adjusted under 35 U.S.C. 154(b) by 0 days.

(21) Appl. No.: 16/618,173

(22) PCT Filed: May 29, 2018

(86) PCT No.: PCT/EP2018/064041
§ 371 (c)(1),
(2) Date: Nov. 29, 2019

(87) PCT Pub. No.: WO2018/219931
PCT Pub. Date: Dec. 6, 2018

(65) Prior Publication Data
US 2020/0111220 A1    Apr. 9, 2020

(30) Foreign Application Priority Data

May 29, 2017 (EP) .................................. 17173250

(51) Int. Cl.
G06K 9/00     (2006.01)
G06T 7/269    (2017.01)
G06T 7/223    (2017.01)

(52) U.S. Cl.
CPC .............. *G06T 7/269* (2017.01); *G06T 7/223* (2017.01); *G06T 2207/10016* (2013.01); *G06T 2207/10021* (2013.01)

(58) Field of Classification Search
CPC .............................. G06T 7/269; G06T 7/223
USPC ........................................................ 382/103
See application file for complete search history.

(56) References Cited

U.S. PATENT DOCUMENTS 7,728,260 B2    6/2010  Johnson
2002/0181745 A1* 12/2002 Hu .......................... G06T 7/207
                                                      382/107
2014/0254684 A1*  9/2014 Lim ...................... H04N 19/103
                                                      375/240.16
2015/0028102 A1*  1/2015 Ren ...................... H04N 5/3454
                                                      235/454

OTHER PUBLICATIONS

Liu, Block-Matching Optical Flow for Dynamic Vision Sensors: Algorithm and FPGA Implementation, 2017, University of Zurich, IEEE International Symposium on Circuits and Systems (ISCAS) (Year: 2017).*
Liu et al. "Block-matching optical flow for dynamic vision sensors: Algorithm and FPGA implementation" 2017 IEEE International Symposium on Circuits and Systems (ISCAS), Baltimore, MD, 2017, pp. 1-4, seen online at doi: 10.1109/ISCAS.2017.8050295.

(Continued)

*Primary Examiner* — Stephen P Coleman
(74) *Attorney, Agent, or Firm* — JMB Davis Ben-David

(57) ABSTRACT

The invention relates to computation of optical flow using event-based vision sensors.

21 Claims, 14 Drawing Sheets

(56) References Cited

OTHER PUBLICATIONS

Baker et al "Lucas-Kanade 20 Years On: A Unifying Framework" International Journal of Computer Vision 56(3), 221-255, 2004 seen online at https://www.ri.cmu.edu/pub_files/pub3/baker_simon_2002_3/baker_simon_2002_3.pdf.
Berthold et al "Determining Optical Flow" Artificial Intelligence, vol. 17, Issues 1-3, Aug. 1981, pp. 185-203 seen online at https://doi.org/10.1016/0004-3702(81)90024-2.
Benosman et al. "Event-Based Visual Flow" In IEEE Transactions on Neural Networks and Learning Systems, vol. 25, No. 2, pp. 407-417, Feb. 2014, seen online at doi: 10.1109/TNNLS.2013.2273537.
Benosman et al "Asynchronous frameless event-based optical flow" Neural Networks vol. 27, Mar. 2012, pp. 32-37, seen online at https://doi.org/10.1016/j.neunet.2011.11.001.
Conradt "On-Board Real-Time Optic-Flow for Miniature Event-Based Vision Sensors" 2015 IEEE International Conference on Robotics and Biomimetics (ROBIO), Zhuhai, 2015, pp. 1858-1863, seen online at doi: 10.1109/ROBIO.2015.7419043.
Barranco et al "Bio-inspired Motion Estimation with Event-Driven Sensors" Advances in Computational Intelligence. IWANN 2015. Lecture Notes in Computer Science, vol. 9094. Springer, Cham. seen online at https://doi.org/10.1007/978-3-319-19258-1_27.
Rueckauer et al "Evaluation of Event-Based Algorithms for Optical Flow with Ground-Truth from Inertial Measurement Sensor" Frontiers in Neuroscience vol. =10 Year=2016 pp. =176 found online at DOI:=10.3389/fnins.2016.00176.
Agha et al "Algorithms and VLSI Architectures for MPEG-4 Motion Estimation" Electronic Systems and Control Division Research 2003, p. 24-27.
Wong et al "A sum of absolute differences implementation in FPGA hardware," Proceedings. 28th Euromicro Conference, Dortmund, Germany, 2002, pp. 183-188, seen online at doi: 10.1109/EURMIC.2002.1046155.
Lichtsteiner et al "A 128$\times$ 128 120 dB 15 $\mu$s Latency Asynchronous Temporal Contrast Vision Sensor," In IEEE Journal of Solid-State Circuits, vol. 43, No. 2, pp. 566-576, Feb. 2008, seen online at doi: 10.1109/JSSC.2007.914337.
Berner et al "A 5 Meps $100 USB2.0 Address-Event Monitor-Sequencer Interface," 2007 IEEE International Symposium on Circuits and Systems, New Orleans, LA, 2007, pp. 2451-2454, seen online at doi: 10.1109/ISCAS.2007.378616.
Barjatya "Block matching algorithms for motion estimation" DIP 6620 Spring 2004 Final Project Paper seen online at ttps://www.researchgate.net/publication/288936050_Block_matching_algorithms_for_motion_estimation.
Zhang et al "Binary Code Ranking with Weighted Hamming Distance," 2013 IEEE Conference on Computer Vision and Pattern Recognition, Portland, OR, 2013, pp. 1586-1593, seen online at doi: 10.1109/CVPR.2013.208.

* cited by examiner (A)

(B)

(A)

(B)

(C)

(D)

(A)

(B)

(C)

(D)

BLOCK-MATCHING OPTICAL FLOW AND STEREO VISION FOR DYNAMIC VISION SENSORS

The invention relates to a method and an apparatus for computing optical flow using an event-based vision sensor such as the dynamic vision sensor (DVS) (e.g. U.S. Pat. No. 7,728,269). Particularly, the present invention relates to an event-based block matching algorithm to calculate OF on FPGA.

In the following such an event-based vision sensor is also referred to as event-based camera or DVS.

Rapid and low power computation of optical flow (OF) is potentially useful in robotics. The event-based vision sensor produces a quick and sparse output, and has high dynamic range, but conventional OF algorithms are frame-based and cannot be directly used with such event-based cameras.

Previous DVS OF methods do not work well with dense textured input and are not designed for implementation in logic circuits.

Optical Flow (OF) estimation has always been a core topic in computer vision; it is widely used in segmentation, 3D reconstruction and navigation. It was first studied in the context of neuroscience to understand motion perception in insects and mammals. In computer vision, OF describes the motion field induced by camera/vision sensor movement through space.

Particularly, in an image sequence of (e.g. 3D) a scene in which objects and/or the vision sensor/camera are moving, a each point of the scene (in a camera- or vision sensor-centered coordinate system) moves along a 3D path which, when projected onto the image plane, yields a 2D path $r(t)=(x(t), y(t))$ having velocities $dr(t)/dt$. The 2D velocities for all visible surface points are referred to as the motion field. The goal of optical flow computation is to compute an approximation to the motion field.

Two well-known inexpensive optical flow algorithms are the Lucas-Kanade [1] and Horn-Schunck [2] methods. The core of many OF methods is a search over possible flows to select the most likely one at each image or feature location. This search with dense image blocks is expensive and difficult to calculate on an embedded platform in real time.

The event-based vision sensor is data-driven rather than regular-sample driven. Regular-sample driven means camera sends the output data at a fixed interval, thus it is usually denoted as a frame-based camera. However, the output of the event-based vision sensor/camera is driven by brightness (or light intensity) changes rather than a fixed sample interval. Therefore, new OF methods need to be designed.

Benosman et al [3] proposed a time-surface method, which combines the 2D events and timestamps into a 3D space and OF is obtained by the local plane fitting. [4] proposed a Lucas-Kanade gradient based method that collects short 2D histograms of events and solves the brightness-constancy constraint on them. In 2015, Conradt [5] proposed a real-time DVS optical flow algorithm implementation on an ARM 7 microcontroller. Barranco [6] proposed a more expensive phase-based method for high-frequency texture regions. [7] re-implemented several of these methods in the Java framework jAER [8] and compared them with the earliest jAER method based on time-of-flight of oriented edges. Its conclusion was that all methods offered comparable accuracy for sharp and sparse edges, but all fail on textured or low spatial frequency inputs, because the underlying assumptions (e.g. smooth gradients or isolated edges) are violated. This paper also introduced the use of an integrated camera inertial measurement unit (IMU) to obtain ground truth global optical flow from camera rotation and published a benchmark dataset from a 240×180 pixel DVS camera, which we use here. Most of the existing work is based on PC software algorithms [3] [4] [6] [7]. Though [5] is based on an embedded system and can work in real-time, it was only characterized for camera rotations, not camera translation through space, and its use of direct time of flight of events makes it unlikely to work well with dense textured scenes and to suffer from aperture problems for edges.

In video technology, OF is called motion estimation (ME) and is widely used in exploiting the temporal redundancy of video sequences for video compression standards, such as MPEG-4 and H.263 [9]. The pipeline for ME includes block matching. Block matching means that rectangular blocks of pixels are matched between frames to find the best match. Block matching is computationally expensive. That is why it is now widely implemented in dedicated logic circuits. In order to address this problem, an example of logic ME implementation based on block matching is presented in Shahrukh [9].

Based on the above, the problem to be solved by the present invention is to provide an efficient method and apparatus for computing optical flow using a dynamic vision sensor, and particularly for computing stereo vision.

Preferred embodiments of these aspects of the present invention are stated in the sub claims and/or are described below.

According to claim 1, a method for computing optical flow in a scene captured by an event-based vision sensor is disclosed which vision sensor comprises a plurality of pixels and is configured to output a stream of change events, wherein each change event corresponds to a change in brightness detected by one of the pixels and comprises a (e.g. microsecond) timestamp (i.e. a time at which the change event took place), a pixel address of the pixel that detected said change in brightness, and a parameter (e.g. a binary polarity) describing a sign of said brightness change, wherein change events are accumulated in at least three time slice frames, namely a first current time slice frame starting at time t, a second time slice frame starting at time t−d, and a third time slice frame starting at time t−2*d, wherein d is a duration of the respective time slice frame which particularly contains a different amount of time, according to the slice interchanging (e.g. rotation) method, wherein change events are accumulated over said duration d into the current first time slice frame (which current time slice frame accumulates the respective change event at the corresponding pixel at which the change event occurs), wherein a reference block of the second time slice frame, which reference block comprises pixels (e.g. a square of pixels) centered on the pixel of the most recent change event in the current first time slice frame, is compared to search blocks in the third time slice frame to find a search block most similar to the reference block using a distance metric (particularly, the relative location of a central pixel of the most similar search block with respect to said pixel of the most recent change event is indicative of the optical flow at the location of said pixel of the most recent change event; particularly, the direction of the optical flow is given by the velocity vector pointing from said pixel of the most recent change event to the central pixel of the most similar search block and the speed is given by the length of the velocity vector divided by the duration of time d between the end of the third time slice frame (t−2*d) and the second time slice frame (t−d.)), and wherein the three time slice frames are periodically interchanged (e.g. rotated) so that the current first time slice frame (t) becomes the second time slice frame (t−d), the second time slice frame (t−d) becomes the third time slice frame (t−2*d), and the third time slice frame (t−2*d) is cleared and becomes the current first time slice frame (t).

Particularly, the present invention proposes a new block-matching based event-based vision sensor OF algorithm. The algorithm was implemented both in software and on FPGA. Particularly, according to an embodiment, for each event, it computes the motion direction as one of 9 directions. Particularly, the speed of the motion is set by the sample interval. Results show that the Average Angular Error can be improved by 30% compared with previous methods. The OF can be calculated on FPGA with 50 MHz clock in 0.2 μs per event (11 clock cycles), 20 times faster than a Java software implementation running on a desktop PC. Sample data is shown that the method works on scenes dominated by edges, sparse features, and dense texture.

Particularly, each pixel of the event-based vision sensor generates a signal (e.g. monotonically) related to a photocurrent generated by the pixel, which photocurrent is proportional to the intensity of the light impinging on the respective pixel, and wherein each pixel outputs a change event merely when the respective signal due to the light impinging on the respective pixel increases by an amount being larger than a first threshold or decreases by an amount being larger than a second threshold since the last change event from the respective pixel.

For instance, the pixels (which are e.g. pixel circuits) are designed to convert the photocurrent into a signal which is the (e.g. natural) logarithm of the photocurrent of the respective pixel. However, the pixels (or pixel circuits) may also be designed to transform the photocurrent to a signal by e.g. applying another monotonically varying function, e.g. a square root function, to the photocurrent, or some other function that changes slowly over time to optimize the response (e.g., to optimally control the sensitive range of the response to be centered around the time-average input value). Particularly, the essential feature of the respective pixel is that it detects changes in the photocurrent and emits change events in response to these changes, wherein particularly these change events are asynchronous events, in contrast to a standard vision sensor which outputs signals from all of its pixels at a constant rate.

According to an embodiment of the method according to the present invention, said distance metric is the sum of absolute differences between reference block pixels and search block pixels.

Further, according to an embodiment of the method according to the present invention, multiple sets of time slice frames are used that subsample an original address space of the event-based vision sensor.

Further, according to an embodiment of the method according to the present invention, said interchanging (e.g. rotation) of said first, second, and third time slice frames is conducted at constant time interval.

Further, according to an embodiment of the method according to the present invention, said interchanging (e.g. rotation) of said first, second, and third time slice frames is conducted at a certain, particularly constant, total event count accumulated into the respective first time slice frame.

Further, according to an embodiment of the method according to the present invention, said interchanging of said first, second, and third time slice frames is conducted when any sub area of the current first time slice accumulates a specified number of change events.

Further, according to an embodiment of the method according to the present invention, said interchanging (e.g. rotation) of said first, second, and third time slice frames is conducted when a total integrated motion of the scene since the last interchanging of said time slice frames exceeds a threshold amount. Particularly, the total integrated motion is a summary statistic of the accumulated measured optical flow, for example the length of the vector sum of measured local optical flow or the sum of the magnitudes of the optical flow (velocity) vectors.

Further, according to an embodiment of the method according to the present invention, said duration d after which said interchanging (e.g. rotation) of said first, second and third time slice frames is controlled depending on an average match distance D between the reference block and the respective most similar search block, which average match distance is determined using a histogram of the calculated optical flow distribution.

Further, according to an embodiment of the method according to the present invention, said total event count is controlled depending on an average match distance D between the reference block and the respective most similar search block, which average match distance is determined using a histogram of a calculated optical flow distribution.

Further, according to an embodiment of the method according to the present invention, said specified number is controlled depending on an average match distance D between the reference block and the respective most similar search block, which average match distance is determined using a histogram of a calculated optical flow distribution.

Further, according to an embodiment of the method according to the present invention, said first, second and third time slice frames each form a binary bitmap time slice frame.

Further, according to an alternative embodiment of the method according to the present invention, said first, second and third time slice frames each form a multibit pixel time slice frame.

Further, according to an embodiment of the method according to the present invention, the respective third time slice frame is searched exhaustively to find said most similar search block.

Further, according to an embodiment of the method according to the present invention, a Diamond Search is used to find said most similar search block.

Further, according to an embodiment of the method according to the present invention, only those reference and search blocks are compared that comprise a sufficient pre-defined number of valid pixels in order to reject outliers, wherein a valid pixel is a pixel at which a change event has been accumulated.

Further, according to an embodiment of the method according to the present invention, said most similar search block is rejected as an outlier in case a distance (e.g. according to the distance metric) between the reference block and said most similar search block exceeds a distance threshold. Here, the notion distance relates to block dissimilarity, i.e. is a block dissimilarity measure. Particularly, if the best matching reference and search blocks are still too dissimilar, then the match should be rejected and no flow event should be output.

Further, according to an embodiment of the method according to the present invention, some of said most recent change events are accumulated into the current first time slice but are skipped and thereby not used for centering of a reference block to improve the real-time performance of the method according to the present invention.

Further, according to an embodiment of the method according to the present invention, said skipping is conducted in case a hardware/apparatus used for conducting the method according the present invention is still busy processing the optical flow from a previous change event.

Further, according to an embodiment of the method according to the present invention, an optical flow event comprising a pixel location, a velocity vector, and particularly a speed in the direction of the velocity vector, is calculated from the respective reference block and most similar search block, and particularly—regarding the speed—also from duration d (see also above).

Further, according to an embodiment of the method according to the present invention, said optical flow events are accumulated onto a regularly-spaced, optionally sub-sampled, motion field.

Further, according to an embodiment of the method according to the present invention, the sum of absolute distances between a reference block and a search block are calculated in parallel.

Further, according to an embodiment of the method according to the present invention, wherein the minimum sum of absolute distances is calculated in parallel.

According to a further aspect of the present invention, a method for computing stereo vision from a left and a right event-based vision sensor is disclosed, wherein each event-based vision sensor comprises a plurality of pixels and is configured to output a stream of change events, wherein each change event corresponds to a change in brightness detected by one of the pixels and comprises a (e.g. microsecond) timestamp (i.e. a time at which the change event took place), a pixel address of the pixel that detected said change in brightness, and a parameter (e.g. a binary polarity) describing a sign of said brightness change,
  wherein for each vision sensor change events are accumulated in at least two time slice frames, namely a first current time slice frame starting at time t, respectively, and a second time slice frame starting at time t−d, respectively,
  wherein change events of the left vision sensor are accumulated over said duration d into the current first time slice frame of the left vision sensor, and wherein change events of the right vision sensor are accumulated over said duration d into the current first time slice frame of the right vision sensor (which respective current time slice frame accumulates the respective change event at the corresponding pixel at which the change event occurs),
  wherein a reference block of the second time slice frame of the right vision sensor, which reference block comprises (e.g. a square of) pixels centered on the pixel of the most recent change event in the current first time slice frame of the right vision sensor, is compared to search blocks in the second time slice frame of the left vision sensor to find a search block most similar to the reference block using a distance metric, and wherein a further reference block of the second time slice frame of the left vision sensor, which further reference block comprises (e.g. a square of) pixels centered on the pixel of the most recent change event in the current first time slice frame of the left vision sensor, is compared to further search blocks in the second time slice frame of the right vision sensor to find a further search block most similar to the further reference block using the distance metric, and
  wherein the four time slice frames are periodically and simultaneously interchanged (e.g. rotated) so that the current first time slice frame of the left vision sensor becomes the second time slice frame of the left vision sensor, the first time slice frame of the right vision sensor becomes the second time slice frame of the right vision sensor, and the first time slice frames of the left and right vision sensor are cleared.

Particularly, the method for computing stereo vision can be further characterized by the features/subject-matter of the sub claims described in context with the method according to the present invention for the computation of optical flow.

According to yet another aspect of the present invention, an apparatus for computing optical flow is disclosed.

The apparatus for computing optical flow in a scene captured by an event-based vision sensor comprises an event-based vision sensor which comprises a plurality of pixels and is configured to output a stream of change events, wherein each change event corresponds to a change in brightness detected by one of the pixels and comprises a (e.g. microsecond) timestamp (i.e. a time at which the change event tool place), a pixel address of the pixel that detected said change in brightness, and a parameter (e.g. a binary polarity) describing a sign of said brightness change,
  wherein the apparatus is configured to accumulate change events in at least three time slice frames, namely a first current time slice frame starting at time t, a second time slice frame starting at time t−d, and a third time slice frame starting at time t−2*d, wherein d is a duration of the respective time slice frame,
  wherein the apparatus is further configured to accumulate change events over said duration d into the current first time slice frame (which current time slice frame accumulates the respective change event at the corresponding pixel at which the change event occurs),
  and wherein the apparatus is further configured to compare a reference block of the second time slice frame, which reference block comprises (e.g. a square of) pixels centered on the pixel of the most recent change event in the current first time slice frame, to search blocks in the third time slice frame to find a search block most similar to the reference block using a distance metric, and
  wherein the apparatus is further configured to periodically interchange (e.g. rotate) the three time slice frames so that current first time slice frame becomes the second time slice frame, the second time slice frame becomes the third time slice frame, and the third time slice frame is cleared and becomes the current first time slice frame.

In corresponding embodiments, the apparatus according to the present invention can further be configured to conduct the method steps according to the present invention. Particularly, the subject-matter of the sub claims/embodiments relating to the method for computing optical flow according to the present invention can be used to further characterize the apparatus according to the present invention. The same applies to the apparatus for stereo vision described below.

According to yet another aspect of the present invention, an apparatus for computing stereo vision comprising a left and a right event-based vision sensor for capturing a scene, respectively, wherein each event-based vision sensor comprises a plurality of pixels and is configured to output a stream of change events, wherein each change event corresponds to a change in brightness detected by one of the pixels and comprises a (e.g. microsecond) timestamp (i.e. a time at which the change event tool place), a pixel address of the pixel that detected said change in brightness, and a parameter (e.g. a binary polarity) describing a sign of said brightness change, wherein the apparatus is configured to accumulate change events for each vision sensor in at least two time slice frames, namely a first current time slice frame starting at time t, respectively, and a second time slice frame starting at time t−d, respectively, wherein the apparatus is further configured to accumulate change events of the left vision sensor over said duration d into the current first time slice frame of the left vision sensor, and wherein the apparatus is further configured to accumulate change events of the right vision sensor over said duration d into the current first time slice frame of the right vision sensor, wherein the apparatus is further configured to compare a reference block of the second time slice frame of the right vision sensor, which reference block comprises (e.g. a square of) pixels centered on the pixel of the most recent change event in the current first time slice frame of the right vision sensor, to search blocks in the second time slice frame of the left vision sensor to find a search block most similar to the reference block using a distance metric, and wherein the apparatus is further configured to compare a further reference block of the second time slice frame of the left vision sensor, which further reference block comprises (e.g. a square of) pixels centered on the pixel of the most recent change event in the current first time slice frame of the left vision sensor, to further search blocks in the second time slice frame of the right vision sensor to find a further search block most similar to the further reference block using the distance metric, and wherein the apparatus is further configured to periodically and simultaneously interchange (e.g. rotate) the four time slice frames so that the current first time slice frame of the left vision sensor becomes the second time slice frame of the left vision sensor, the first time slice frame of the right vision sensor becomes the second time slice frame of the right vision sensor, and the first time slice frames of the left and right vision sensor are cleared.

Further features, advantages and embodiments of the present invention are described in the following with reference to the Figures, wherein FIG. 1 shows an apparatus/system (OF architecture) that can be used for conducting the method according to the present invention;

FIG. 2 shows a finite state machine of the apparatus shown in FIG. 1;

FIG. 3 shows a Hamming distance computation circuit, particularly for a Hamming distance implementation for one 9×9 block match. Particularly, there are 9 of these circuits for the 9 flow directions;

FIG. 4 shows a minimum distance computation circuit, particularly a sort algorithm implementation block for HD0, simplified for 5 inputs rather than 9. Particularly, there are 9 of these blocks;

FIG. 5 shows results of OF computations. The arrows are the flow vectors and their length represents the speed (determined by the slice duration d). On events of the event-based vision sensor are green and off events are red. The color wheel indicates the flow vector direction color. The 2D gray scale histogram above each color wheel shows the distribution of flow event directions (here 9 direction bins were used) in the time slice. The brightest bin votes the highly possible direction of the global motion. (A) is the boxes scene from [7] with d=40 ms. (B) is pavement recorded by a down-looking event-based vision sensor; d=10 ms. (C) is a gravel area with d=3 ms. For clarity, downsampling was used to compute 1 flow event every 100 change events;

Figure 11:
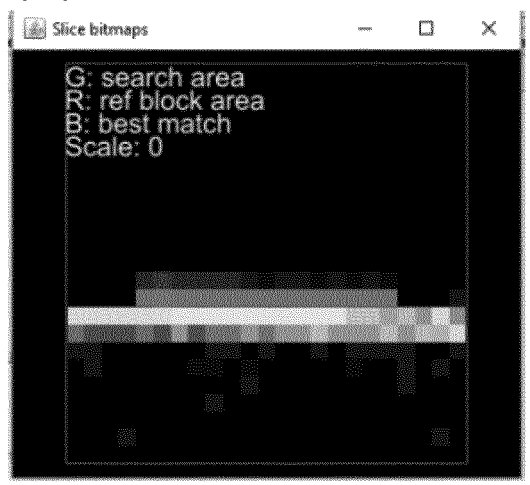
Figure 11:
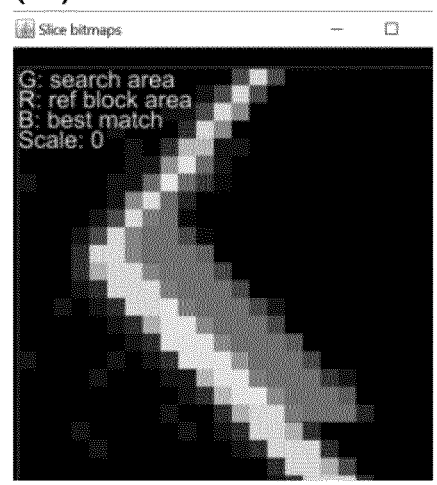
Figure 11:
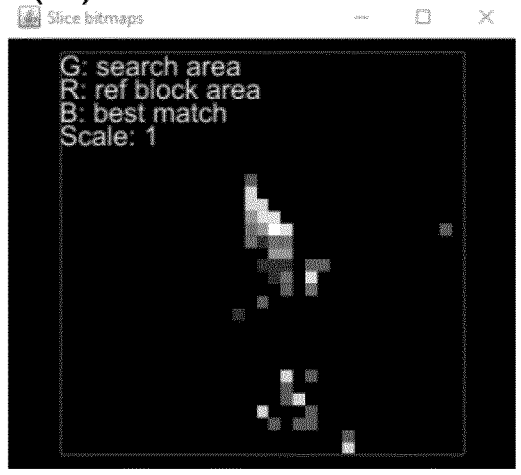
Figure 11:
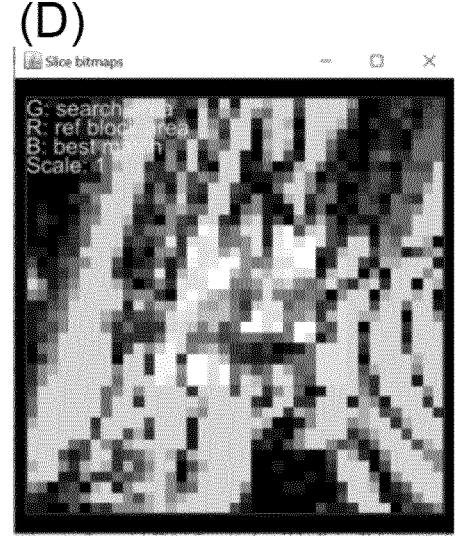

FIG. 11. shows examples of block matching for various image features. Red are reference block slice pixels. Green are search area slice pixels.

Figure 12:
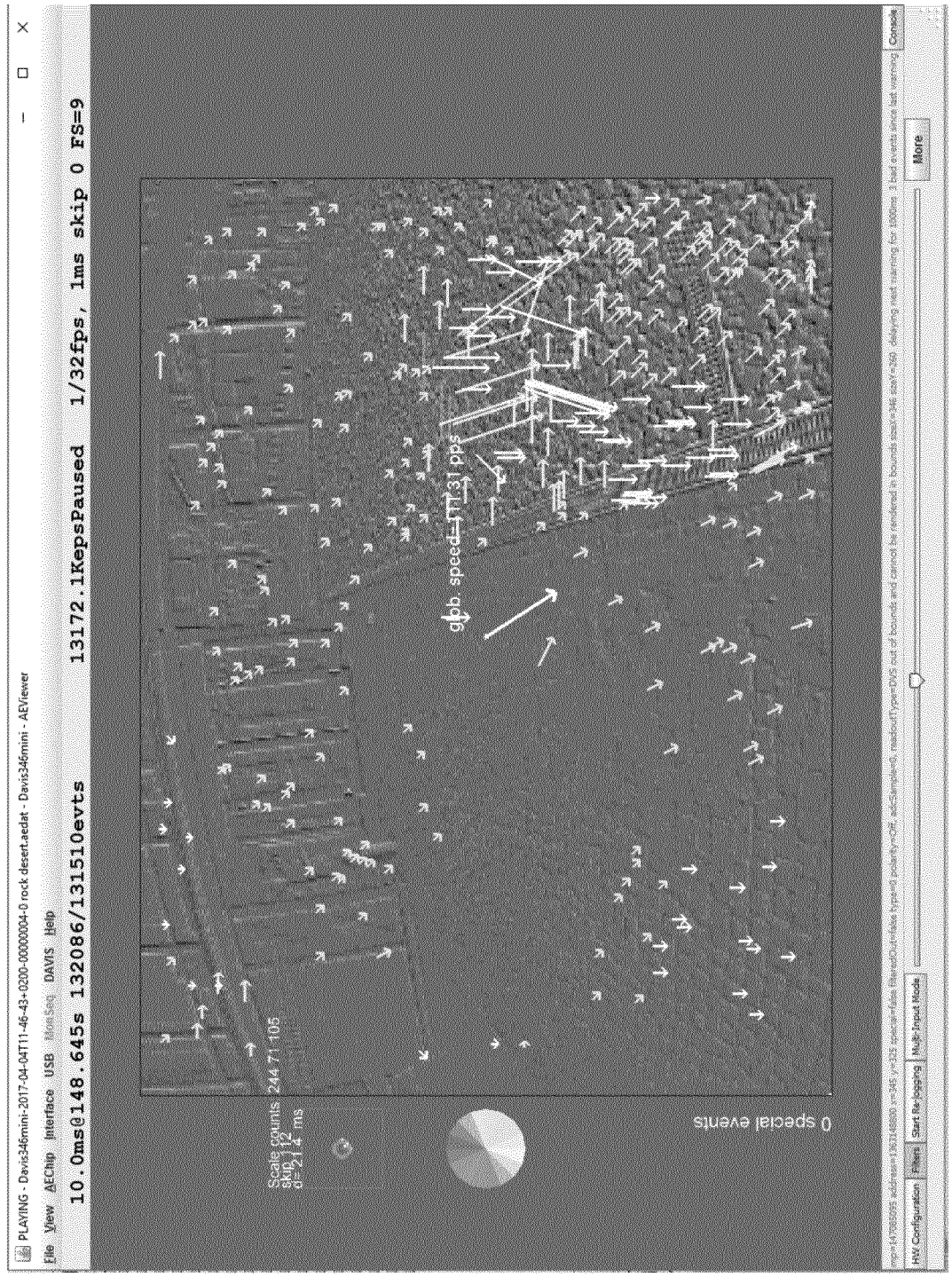
Figure 13:
Figure 14:
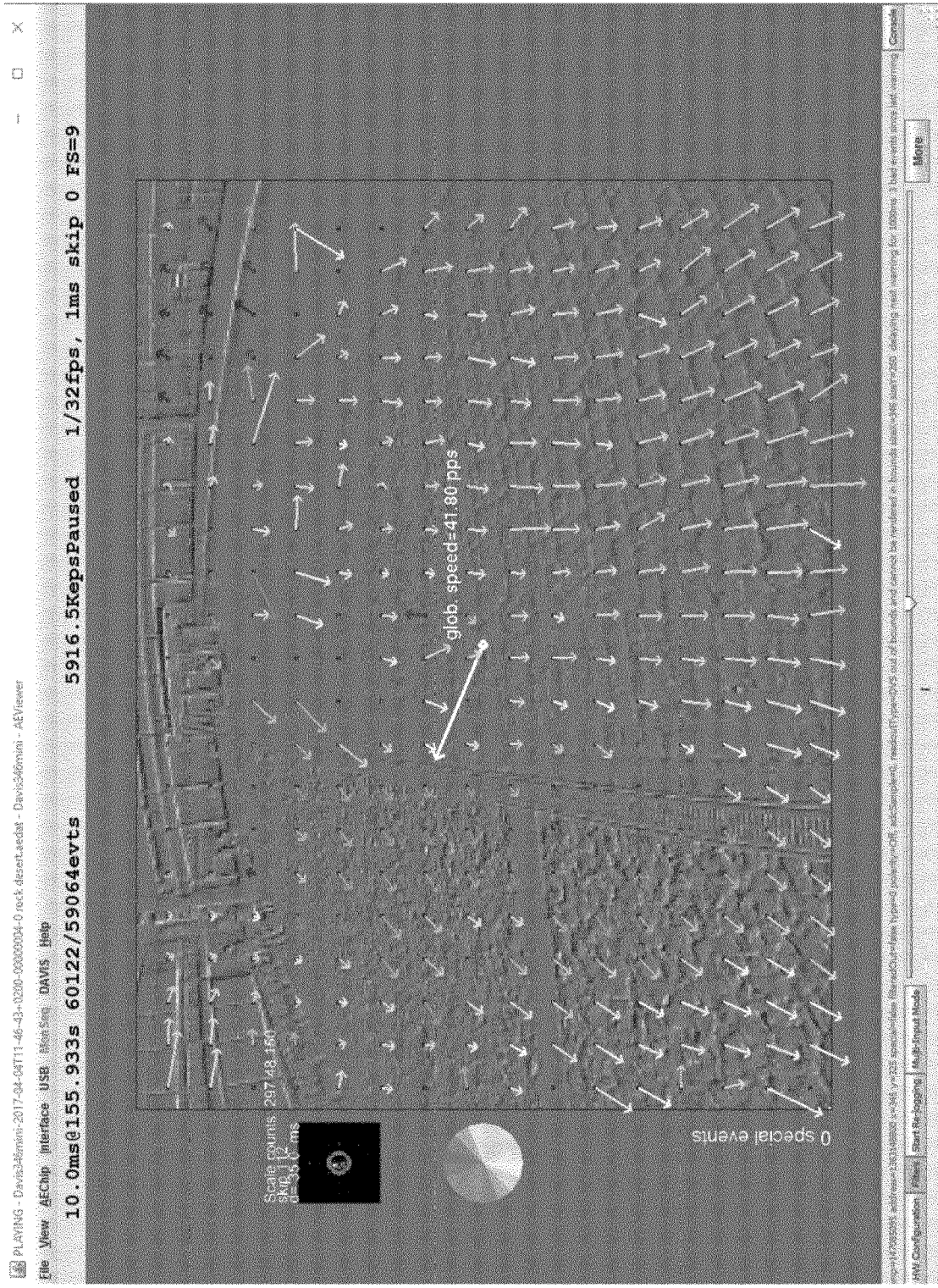

Blue pixels show matched block pixels. (A): edge. (B): Corner. (C):

isolated feature. (D): texture;

FIG. 12 shows an example of a multi-scale multi-bit flow result using event skipping. Scene is captured during walking over outdoor scene. Ns=3 scales were used with a search distance of r=4 for each scale and a maximum slice value of +/−7 signed change events. The area method was used to rotate slices with areas of 32×32 pixels and rotate count NR=4000 events. The last time slice interval at this moment was 21 ms;

FIG. 13 shows details of the FIG. 12 optical flow (OF) histogram and counts of flow events at each scale for the 10 millisecond event packet displayed in FIG. 12. The OF histogram center which is at the center of the red circle and blue box corresponds to zero motion. Where the area inside the blue box is gray, there are no flow event block matches in these directions. The white dots show that most of the matches are down and to the right, corresponding with the preponderance of flow vectors in FIG. 12 that point down and to right. The red circle shows the average radius of OF block matches. It is used in the described algorithm for controlling the slice duration. The numbers 244 71 105 next to "Scale counts:" are counts of flow events at each scale starting from full resolution (s=0) to subsampled resolution by 4 resolution (s=2). For this packet, the distribution of best matches is approximately evenly distributed over all 3 scales. At this moment, 112 events are skipped for flow processing, but not slice accumulation. The most recent slice interval was 21.4 ms;

FIG. 14 shows an example from a later part of scene of FIG. 12 of the motion field (MF) output. OF events are subsampled onto the MF in 16×16 pixel regions. A diffusion step is applied after each lowpass filter time constant of 144 ms time interval has passed. It is evident from the preponderance of flow vectors pointing downwards that the camera was being moved over the ground towards the building seen at the top of the image.

Figure 15:
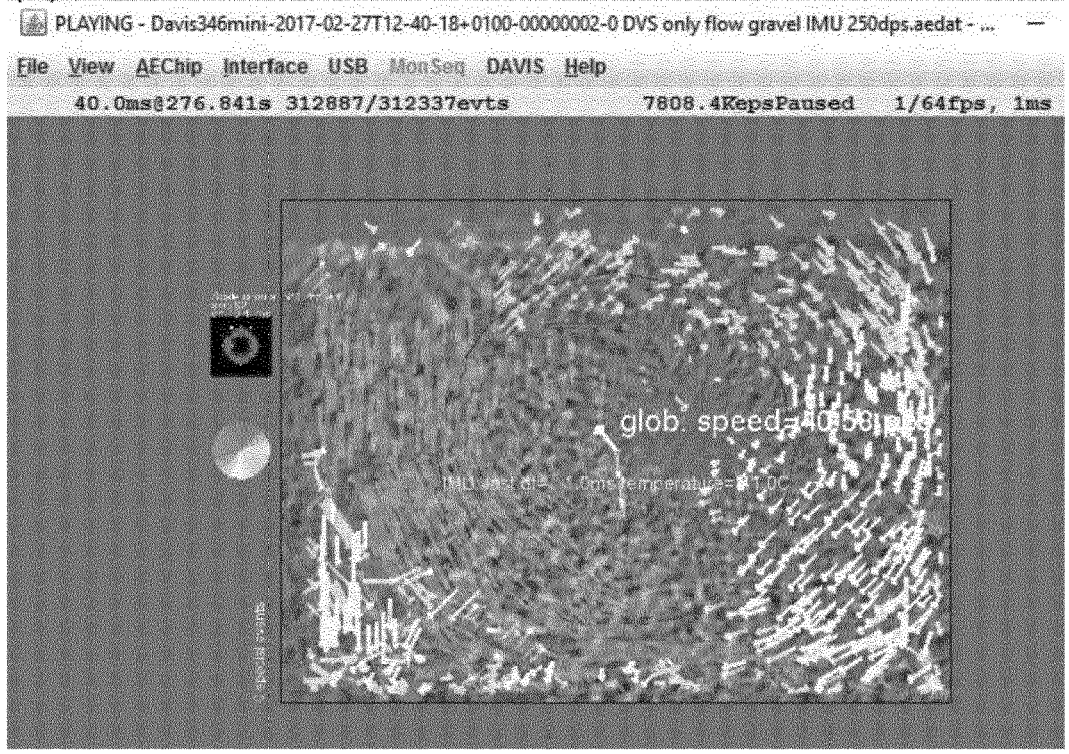
Figure 15:
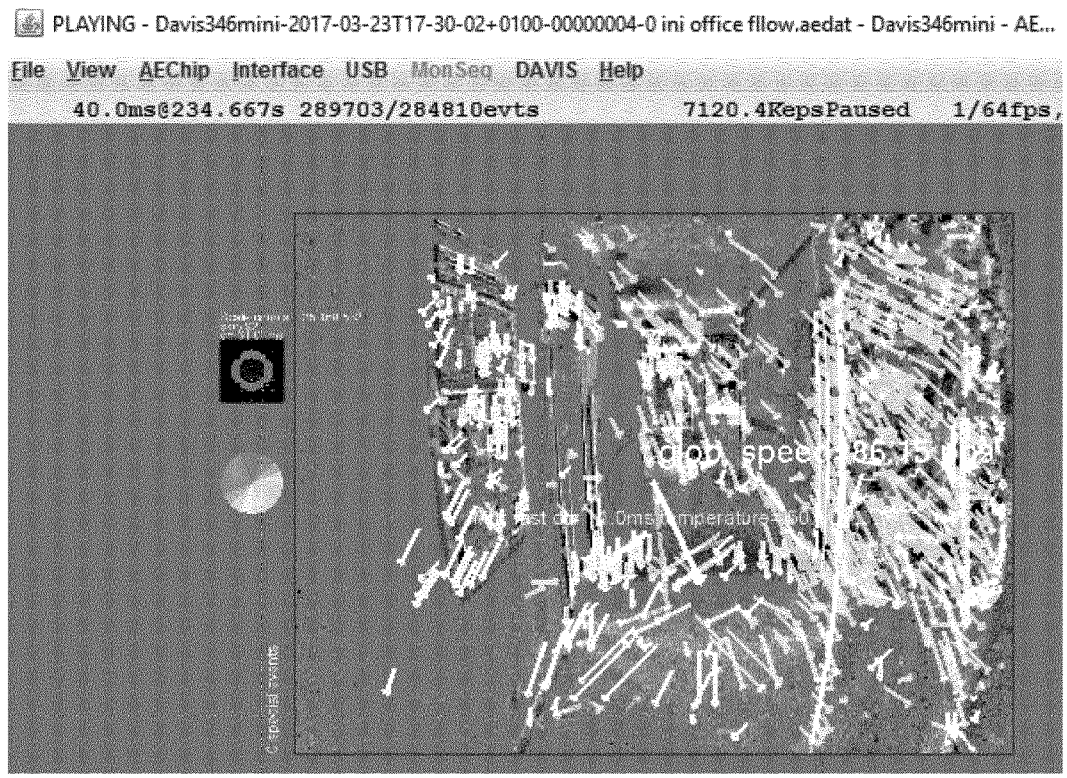
Figure 15:
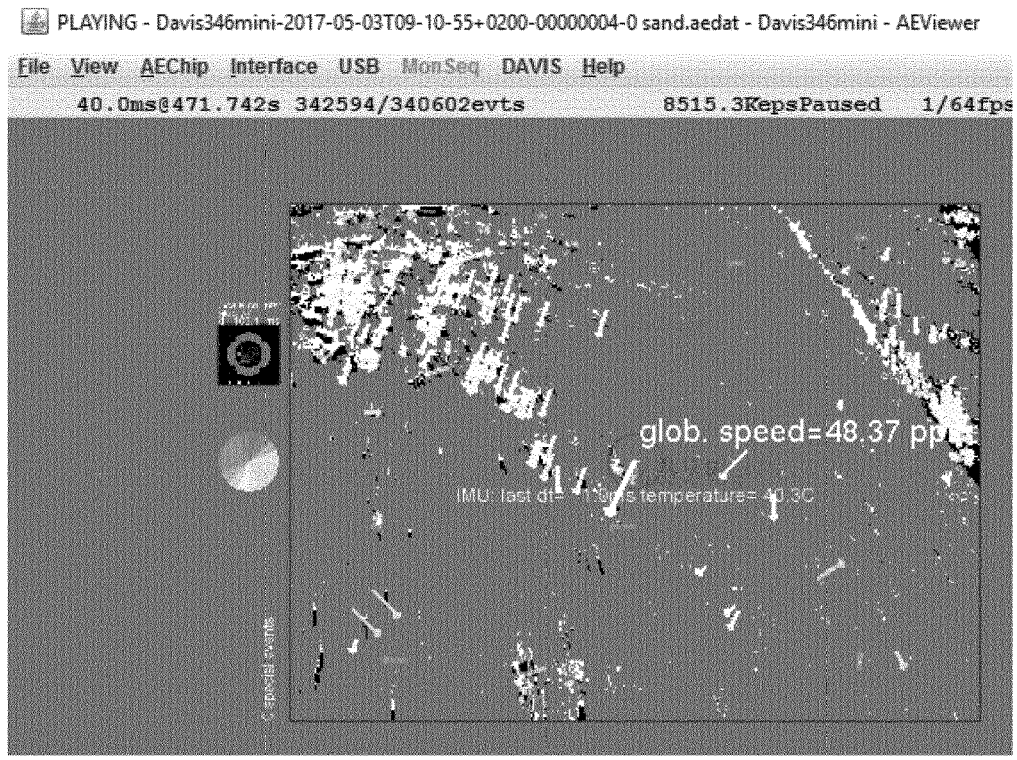
Figure 15:
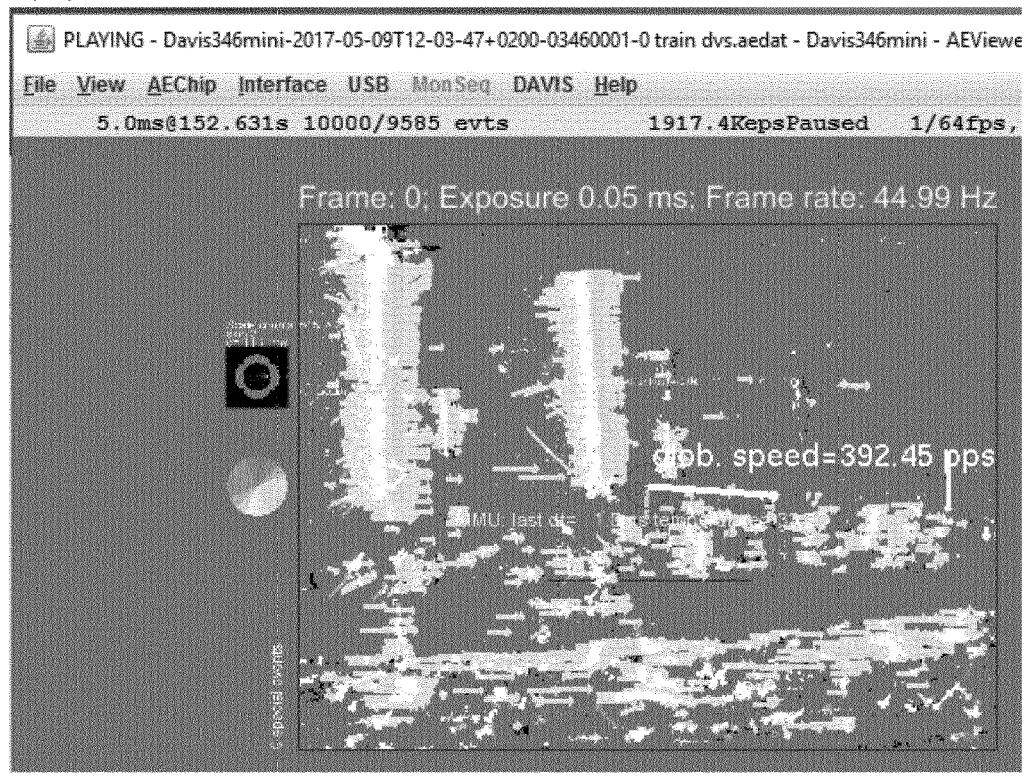

FIG. 15 shows more scenes. (A): rotating over gravel, outdoors. (B): walking along corridor, indoors. (C): walking over sand along the edge of seashore, outdoors. (D): from train window. All scenes were captured using identical 3 scales, block size 11 pixels, using diamond search, with search distance 3 pixels. Slice maximum value+/−7. AreaEventNumber method was used to set slice event numbers under feedback control.

The output of an event-based vision sensor or DVS is a stream of brightness change events. Each change event has an (e.g. microsecond timestamp), a pixel address (of the pixel that detected the change event), and a parameter (e.g. binary polarity) describing the sign of the brightness change. Each event signifies a change in brightness of about 15% since the last event from the pixel. In the simplest implementation, for which FPGA implementation results are available, events are accumulated into time slice frames (or time slice memories) as binary images, particularly ignoring said parameter (event polarity), in order to achieve minimum logic and memory size. Here, these bitmap frames are referred to as slices. A block is a square centered around the incoming event's location. Matching is based on a distance metric. Particularly, according to an embodiment, the Hamming Distance (HD) is used as the distance metric. HD is the count of the number of differing bits. For bitmaps, HD is the same as the better-known Sum-of-Absolute-Differences (SAD).

The hardware evaluation system/apparatus is divided into two parts, one for data sequencing and monitoring and the other for the algorithm implementation. For the first part, a monitor-sequencer board [13] designed by the Univ. of Seville was used. The sequencer converts the event-based benchmark dataset [7] into real-time hardware events sent to the OF FPGA. During OF calculation, the monitor collects the OF events and sends them over USB to jAER for rendering and analysis. In this way one can compare software and hardware processing of the OF algorithm. In the framework of the examples/embodiments described herein, prerecorded data was used to allow systematic comparison between software and hardware implementations.

Figure 1:
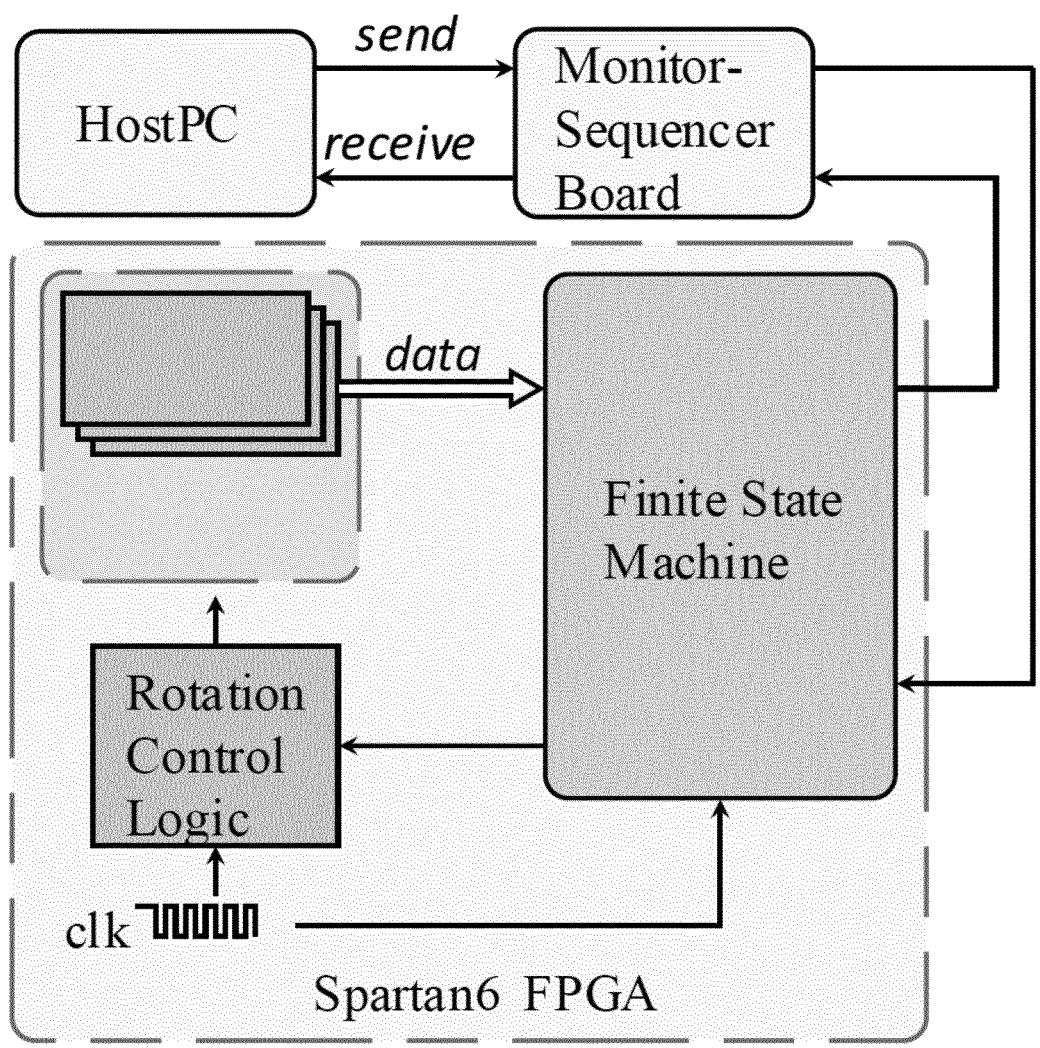
Figure 2:
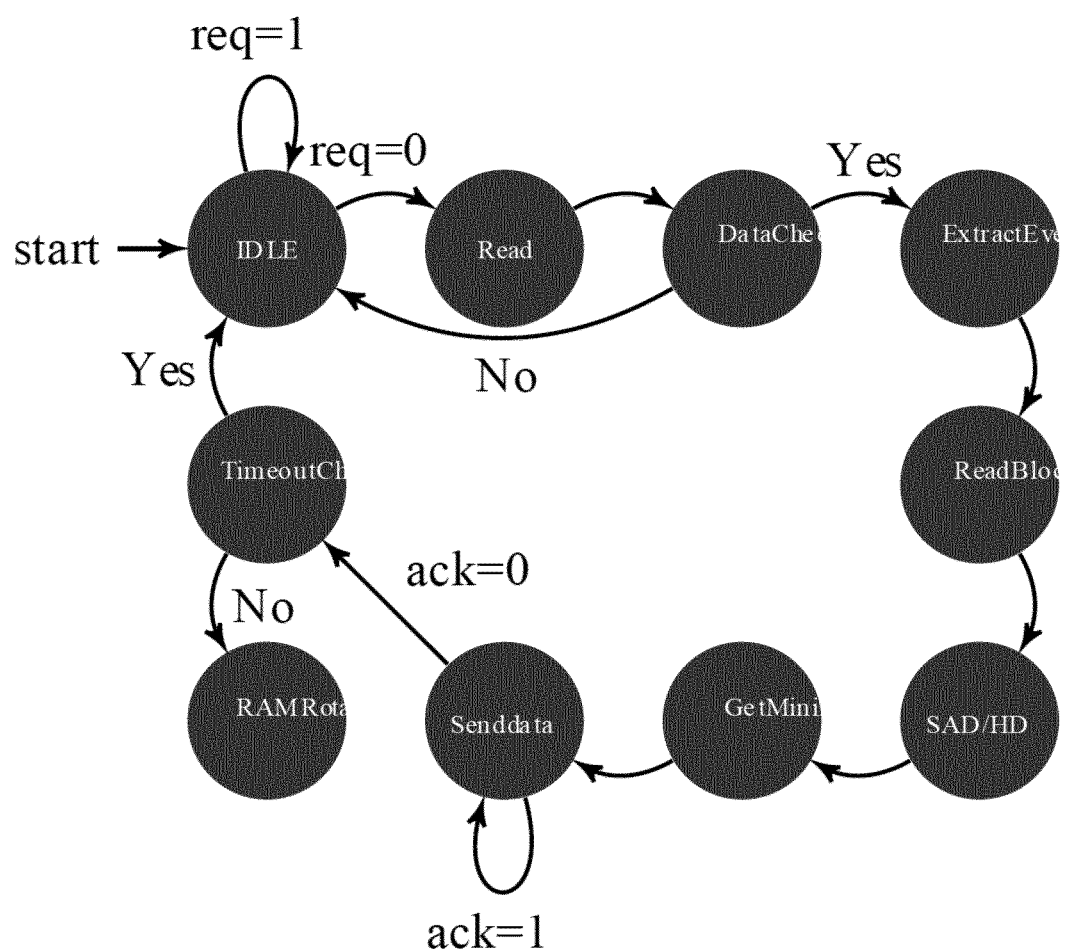

An embodiment of an apparatus/OF architecture according to the present invention is shown in FIG. 1. It contains three main modules: a finite state machine (FSM), random access memory block memory (RAMs) and a rotation control logic. The architecture of the FSM is shown in FIG. 2. The FSM consists of three parts: data receiving module, OF calculation module, and data sending module. The data sending and data receiving module communicate with the monitor-sequencer. The OF module is described in detail further below.

Three 240×180-pixel change event bitmap slices are stored in RAM. These slices are also referred to as time slice memories and are like binary image frames from conventional cameras but in the case of an event-based vision sensor (e.g. DVS) one can arbitrarily select the slice interval. One is the current collecting time slice starting at time t and the other two are the past two slices starting at times t−d (younger time slice memory) and t−2*d (older time slice memory). The time interval d is the slice duration, for example 10 ms. Particularly, according to an example d=100 ms was used to match the slow motion in the dataset. At intervals of t−d, the rotation control logic rotates (or interchanges) the three slices. The t slice accumulates new data. It starts out empty and gradually accumulates events, so it cannot be used for matching to past slices. The two past slices t−d and t−2*d are used for OF, but the OF computation is done at the location of each event stored into the t slice, and thus is driven by these events. Slices are stored in block RAM on the FPGA. The total size of the RAM is 240×180×3, matching the pixel array size of the event-based vision sensor. It is generated by the IP Core of Xilinx.

According to an embodiment, the optical flow algorithm/method according to the present invention is organized as follows.

When an event arrives, a single reference block from time slice t−d and 9 blocks from time slice t−2*d are sent to the HD module to calculate the distances. The reference block and search area are centered on the change event x,y location (i.e. the pixel location where the most recent change event has been detected). In the current FPGA implementation, the block contains 9×9 pixels according to an embodiment. For the t−d time slice, only one center block is used as the reference according to an embodiment. The algorithm/method according to the present invention finds the most similar block on the t−2*d time slice. According to the brightness-constancy assumption of OF, one should see a similar block in the t−2*d time slice for the block that best matches the actual OF. Particularly, the algorithm search over the 8 blocks centered on the 8 neighbors of the current event address and one block centered on the reference and chooses the one with minimum distance.

Figure 3:
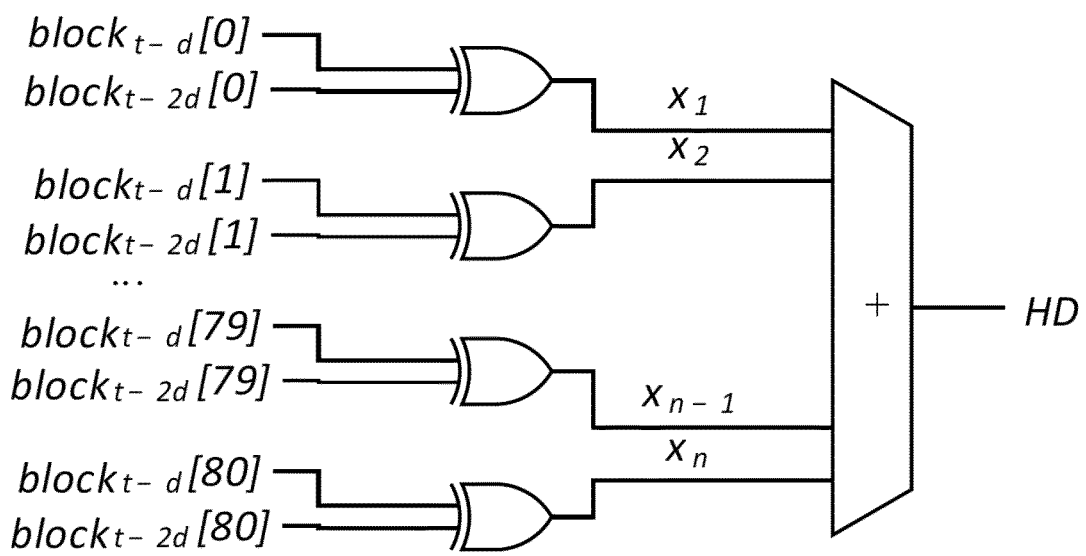

1. Hamming Distance: The implementation of one Hamming distance (HD) block is shown in FIG. 3. A total of 81 XOR logic gates receive input from corresponding pixels on the slices. The XOR outputs are summed to compute the HD. The sum-of-absolute differences (SAD is used later in a more general form of the algorithm.

Figure 4:
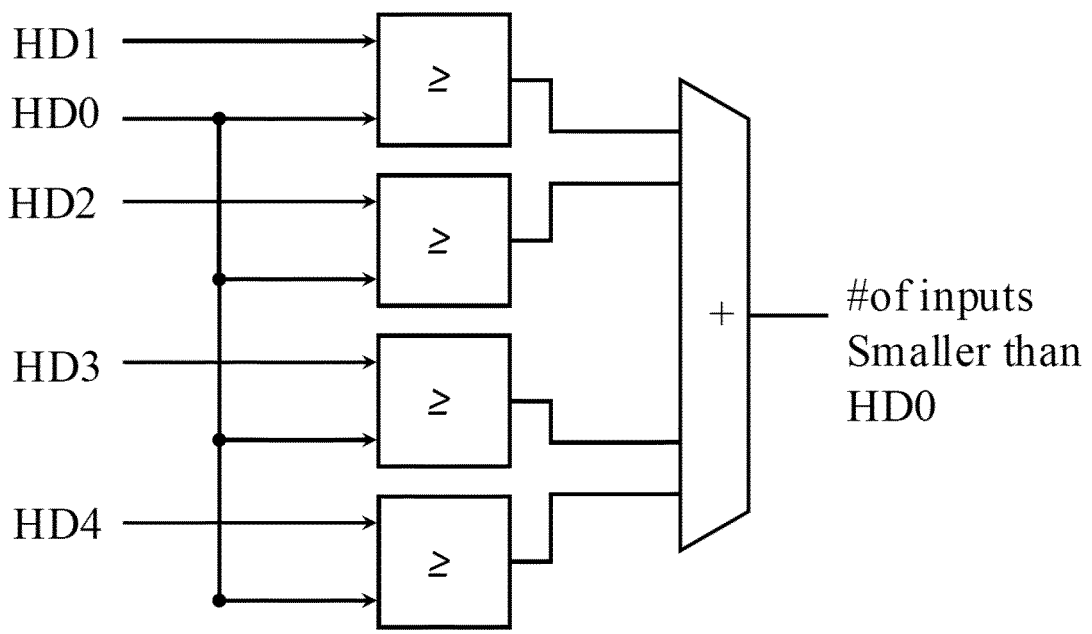

2. Minimum Distance Computation: The last step of the algorithm is to find the minimum distance candidate. Part of the novel minimum circuit is shown in FIG. 3. It is a parallel implementation that outputs the index of the minimum distance direction. For instance, if we need to find the minimum among 5 data: HD0-4 (output from FIG. 4), the circuit can be divided into 5 parts. The first part in FIG. 3 compares HD0 with all the other data and outputs a count of how many times data0 is larger than HD1-4. The other 4 parts are implemented in the same way and all those parts are computed concurrently. At the end, the part whose sum is zero is the minimum candidate. Thus the minimum distance candidate is determined in one clock cycle.

EXAMPLES

The Xilinx Spartan 6 family chip xc6s1×150t was used to implement the algorithm/method according to the present invention. It has 184304 Flip-Flops and 92152 LUTs and 4 MB block memory. The implemented OF design occupies 0.9% of the Flip-Flops, 5% of the LUTs and 5% of the block RAM. For the test dataset, the event-based optical flow benchmark dataset in [7] was used which also provides the evaluation method and the ground truth. Further, also additional natural scene data was used for sparse and dense texture examples.

Three sample datasets were tested. All of them are real DVS data (cf. FIG. 5): the box translation (A), pavement (B), and gravel (C) corresponding to edge, sparse points, and dense texture respectively. The boxes scene has a box in the foreground and clutter in the background and the camera pans to the left, producing rightwards global translation mostly of extended edges. In the pavement dataset, the camera was down-looking and carried by hand; the flow points downwards and to the right. Imperfections in the pavement cause sparse features. The gravel dataset is recorded outside and has dense texture; movement is eastward.

Figure 5:
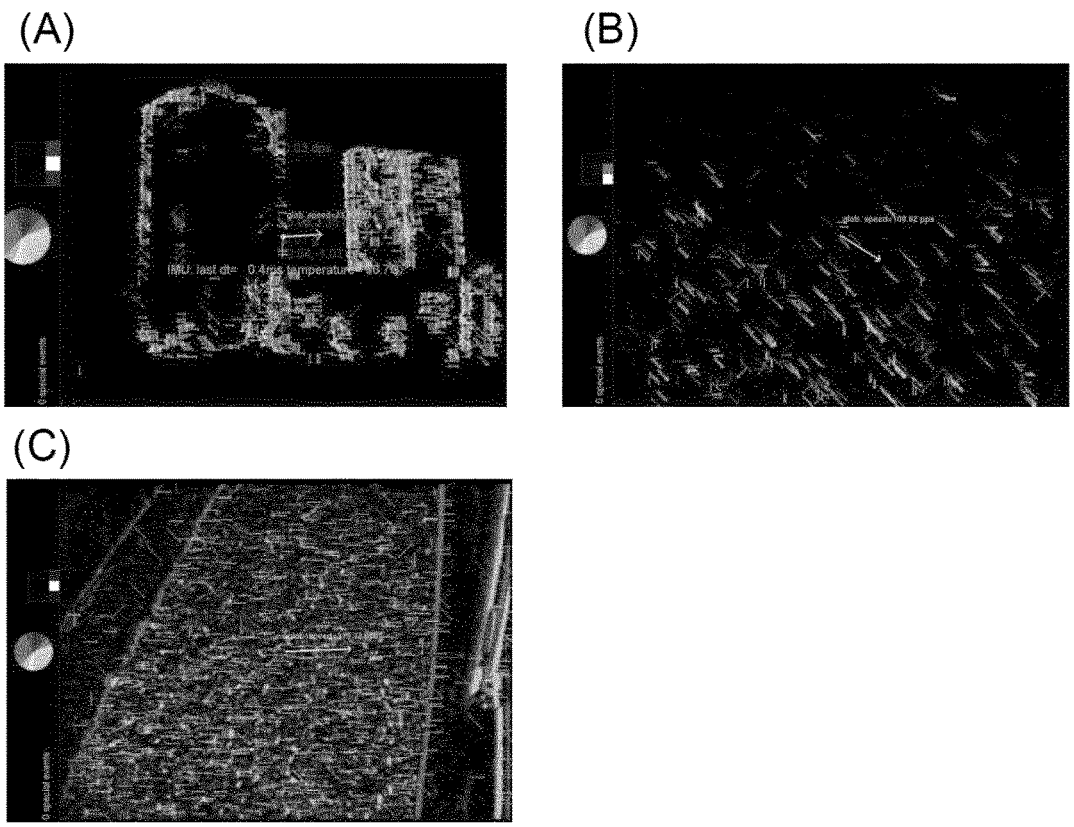

The block-matching OF results are shown in FIG. 5. It can be seen that in each scene, most vectors point correctly east for box translation, southeast for the pavement scene, and east for the gravel scene. Errors are mostly caused by noise of the event-based vision sensor or aperture ambiguity for the extended edges.

Figure 6:
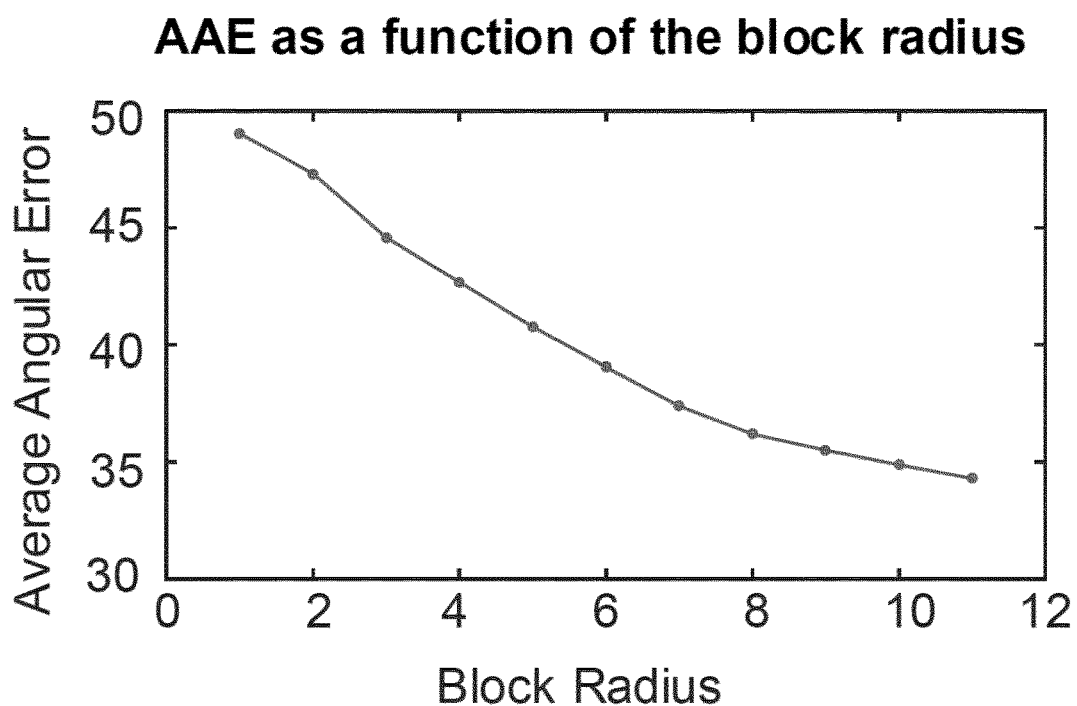
FIG. 6 shows the relationship between the block radius and AAE.

Regarding an accuracy analysis [7] proposed two ways to calculate event-based OF accuracy, based on similar metrics used for conventional OF. One is called Average Endpoint Error (AEE) and the other is Average Angular Error (AAE). AAE measures error in the direction of estimated flow and AEE includes speed error. These two methods are already implemented in jAER [8]. They use IMU data from a pure camera rotation along with lens focal length to compute the ground truth OF for each change event. Since the output data of the sequencer lacks IMU data, the OF accuracy was measured using the PC implementation. The algorithm pipeline between FPGA and PC is identical, so it will not influence the accuracy. The result is also compared with [7]. Two variants of the event-based Lucas-Kanade and Local Plane algorithms were chosen. The errors from all the algorithms are shown in Table I below. $PM_{hd}$ represents the block matching algorithm with HD metric. The relationship between the block radius and AAE is shown in FIG. 6.

TABLE I

OF algorithm's accuracy

| AAE transBoxes | | AEE transBoxes | |
|---|---|---|---|
| $PM_{hd}$ | 42.68 ± 33.82 | $PM_{hd}$ | 17.86 ± 6.31 |
| $LK_{sg}$ | 30.30 ± 44.35 | $LK_{sg}$ | 24.72 ± 26.11 |
| $LK_{bd}$ | 98.92 ± 42.24 | $LK_{bd}$ | 37.00 ± 15.18 |
| $LP_{orig}$ | 77.18 ± 33.73 | $LP_{orig}$ | 93.02 ± 107.02 |
| $LP_{sg}$ | 47.52 ± 54.44 | $LP_{sg}$ | 98.32 ± 82.5 |
| (a) AAE comparison | | (b) AEE comparison | |

Further, the time complexity of the software grows quadratically with the block size while only linearly in FPGA. The processing time of the algorithm contains three parts: reading data from three slices, HD calculation and looking for the minimum. Both FPGA implementation and software implementation on PC consume linear time to read data from RAM since multiple data cannot be read from one RAM simultaneously. However, the latter two parts take constant time (2 clock cycles) on FPGA while quadratic time on PC. In summary, processing time on FPGA is (block dimension+2) cycles. According to an example, the FPGA runs at 50 MHz frequency and the block dimension is 9. Thus the whole algorithm will take only 220 ns per change event, i.e. 0.22 μs. On a PC, it takes 4.5 μs per event for a Java implementation to run the algorithm. The implementation on FPGA is 20 times faster than that on the PC. According to an example, the implementation uses single port RAM, but could be further sped up by using multiple banks.

The present invention provides a new method to estimate the event-based optical flow, particularly on FPGA and in real time. The software computational cost of Hamming Distance increases quadratically as the block size increases, however, in FPGA, all the bits in the block can be calculated at the same time which leads to a constant time for all block sizes. This greatly reduces the overall computation time for the FPGA implementation, which is 20 times faster than the software implementation. In the current implementation, every single incoming event is processed (allowing an input event rate of up to 5 Meps to be handled using a modest FPGA clock of only 50 MHz). However, processing every change event is not required, as illustrated in FIG. 5(C), where OF computation is down-sampled, but the change events of the event-based vision sensor (e.g. DVS) still indicate locations to estimate the flow.

The general embodiment of the present invention described above can be further modified. Corresponding embodiments will be described in the following. Particularly, there are three possible improvements. The current implementation estimates only direction of flow and not speed. Measuring speed requires additional search distances and there are well-known algorithms for efficient search [14]. Secondly, other distance metrics can be also be used because event sequences collected onto the slices usually have different length due to noise and HD is somewhat ambiguous [15]. Finally, a feedforward and feedback control can be implemented on the slice duration to better exploit the unique feature of the event output of the event-based vision sensor (DVS) that it can be processed at any desired sample rate. This capability is a key distinguishing characteristic from frame-based vision, where sample rate and processing rate are inextricably coupled. It allows a block-matching approach for the event-based vision sensor (e.g. DVS) that achieves high OF accuracy even with only small search distances and modest hardware resources.

According to a further embodiment, multibit time slices can be used.

A limitation of using binary bitmap time slices is that the pixel values saturate after the first event accumulated to a bitmap pixel location. They also disregard the event polarity (ON/OFF) of the event-based sensor and hence can potentially incorrectly match edges with opposite polarity.

An improvement is to use multibit signed time slices. The events are accumulated into pixel memories as described earlier, but now the pixel values are (optionally) signed, and have an n-bit representation taking a range of values, i.e. for n=2 bits, the unsigned range is 0,1,2,3. For the signed 2-bit version, the range for n=2 using the 2's complement binary representation is 2, 1,0,1, encoded by the binary values 11,10,00,01. In the case of n=2 bits, if 1 ON event and 3 OFF events are accumulated by a pixel, then the resulting slice pixel will have the value 3 in the unsigned case and −2 in the signed case. The update of the multibit values preferably should use saturating math, so that overflow does not wrap the count around but rather leaves it at its maximum absolute value.

The memory cost of multibit time slices is directly proportional to n. The arithmetic cost is also proportional to n, since the XOR gates are replaced by full-adders to compute the sum-of-absolute differences (SAD) between the reference block and search block areas.

According to a further embodiment of the method/system according to the present invention an extended and optimized search can be used.

The implementation described earlier searched only the target block and its 8 nearest neighbors. An improvement is offered by extending the search range to a larger distance range r. For the implementation described above, r=1. Increasing r allows a finer range of motion vector angles and speeds to be computed. An exhaustive search of the $(2r+1)^2$ search locations is possible, but well-known techniques such as the two-step search (TSS) and diamond search (DS) reduce the required effort significantly. Our software implementation of the DS algorithm shows that for r=12 and block dimension 9 (r=5), the event processing time is reduced by a factor of 29× by using DS, from 377 μs/event with full search to 13 μs/event using DS.

According to a further embodiment of the method/system according to the present invention, mutliscale spatial time slices can be used.

A limitation of the approach described so far is the limited dynamic speed range of the method, since matching can only cover a spatial range of square radius r around the reference location. One way to increase the search range with only linear increase in search time is to use a multiscale pyramid. In this method, change events are accumulated into a stack of time slices. Each slice in the stack subsamples the original event addresses in x and y directions by a factor of 2 more than the previous scale. I.e. if scale s is the time slice spatial scale where s=0 means the original full resolution scale, then events are accumulated into scale s by first right shifting the event x and y addresses by s bits, and then accumulating the resulting event into the scale s slice. For example, in the s=1 scale slice, each pixel accumulates events from a 2×2 pixel region in the full resolution original pixel address space. Thus the specific operations to accumulate each event are given by the following Java code snippet taken from the present reference implementation:

```
private void accumulateEvent(PolarityEvent e) { // e is the DVS event
    for (int s = 0; s < numScales; s++) { // iterate over all scales
        final int xx = e.x >> s; // subsample the x address
        final int yy = e.y >> s; // subsample the y address
        int cv = currentSlice[s][xx][yy]; // find current value of slice at scale s
        cv += rectifyPolarties ? 1 : (e.polarity == PolarityEvent.Polarity.On ? 1 : -1); // optionally, rectify the polarity
        if (cv > sliceMaxValue) { // apply saturating math to limit range of result slice value to maximum allowed
            cv = sliceMaxValue;
        } else if (cv < -sliceMaxValue) {
            cv = -sliceMaxValue;
        }
        currentSlice[s][xx][yy] = (byte) cv; // store the new slice value in the slice
    }
}
```

Figure 7:
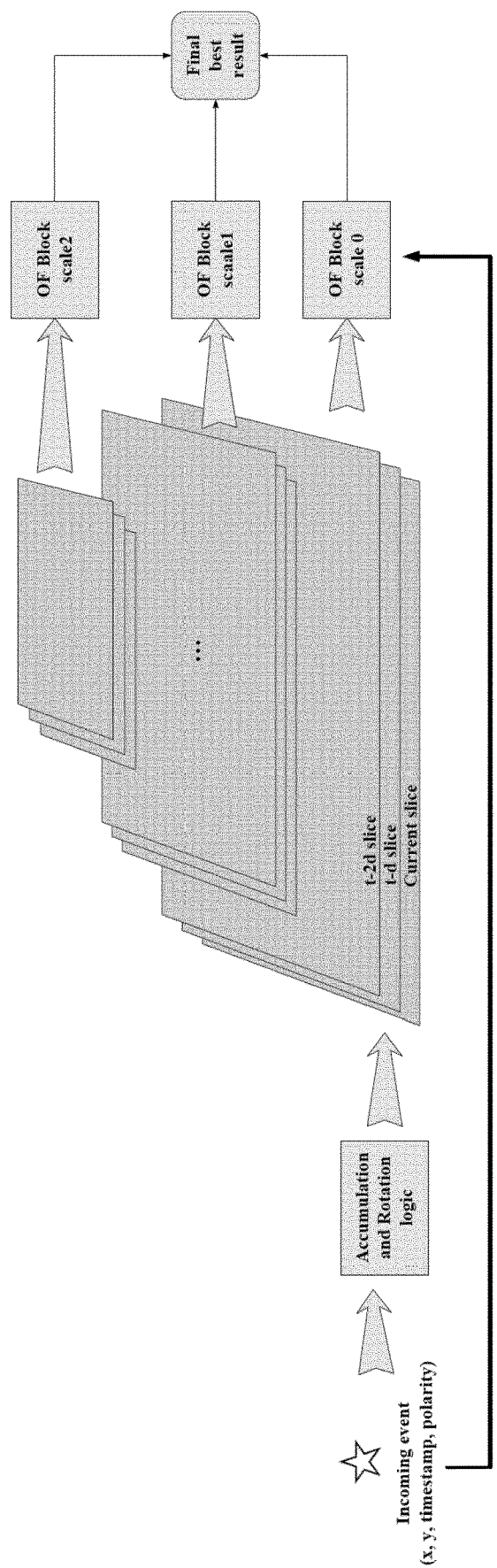
FIG. 7 shows an implementation for event accumulation and OF processing with multiple scales and event skipping.

It is shown in FIG. 7 how using these multiple scales, a search can be performed out to a range r using the subsampled slice at each scale. Then the final result can be chosen from the best matching block over all the scales. The total search range is extended to a radius.

The cost of using multiple spatial scales is the increased memory for storing the slices and the additional searches over these scales. Parallel hardware units could search over all the scales simultaneously, since they use separate memory blocks. The benefit is that search over scale s covers a radius in the image space of $2^{ns}r$. The total cost increase of only a factor ($n_s$+1) in logic or time. For example, using $n_s$=3, the linear range of the search is increased by a factor of 8, the search area is increased by a factor of 64, but the cost in area or time is increased by only a factor of 3.

Using multiple scales has the additional benefit that it provides finer speed and angle resolution for slower motions. Thus the precision of the flow estimate is maintained when the speed is low.

It is preferred to combine the multibit and multiscale techniques, since the subsampled time slices collect more events per pixel than the original full scale slices. Thus they can more easily saturate. In practice we found that a modest value of multibit bit resolution n=4 allowing accumulation of up to 16 events is sufficient to prevent saturation when using 3 scales as shown in example data in FIG. 11 and FIG. 12.

Further, concerning an adaptive slice duration, three software methods for accumulating bitmap slices have been implemented, which are denoted as ConstantDuration, ConstantEventNumber and AreaEventNumber. In the current hardware FPGA design, only the ConstantDuration method is implemented, but the other methods are easily implemented into hardware.

ConstantDuration: Here the slices are accumulated to time slices uniformly of duration d. This method corresponds most closely to conventional frame based methods. It has the disadvantage that if the scene motion is too fast, then the movement between slices may be too large to be possible using a specified search distance. If the movement is too slow, then the features may not move enough between slices, resulting in reduced flow speed and angle resolution.

ConstantEventNumber: Here the slices are accumulated until they contain a fixed total count of change events K. If K is large then the slices will tend to have larger d. But if the scene moves faster, then the rate of change events also increases, which for fixed K will decrease d. Thus the ConstantEventNumber method automatically adapts d to the average overall scene dynamics.

AreaEventNumber: A drawback of the ConstantEventNumber method is its global nature. If K is set properly for a scene with uniformly high texture, then using the same K on a scene with isolated features results in much longer d since the overall change event rate is lower. Thus the correct d is not maintained for optimum matching over all scenes.

Figure 8:
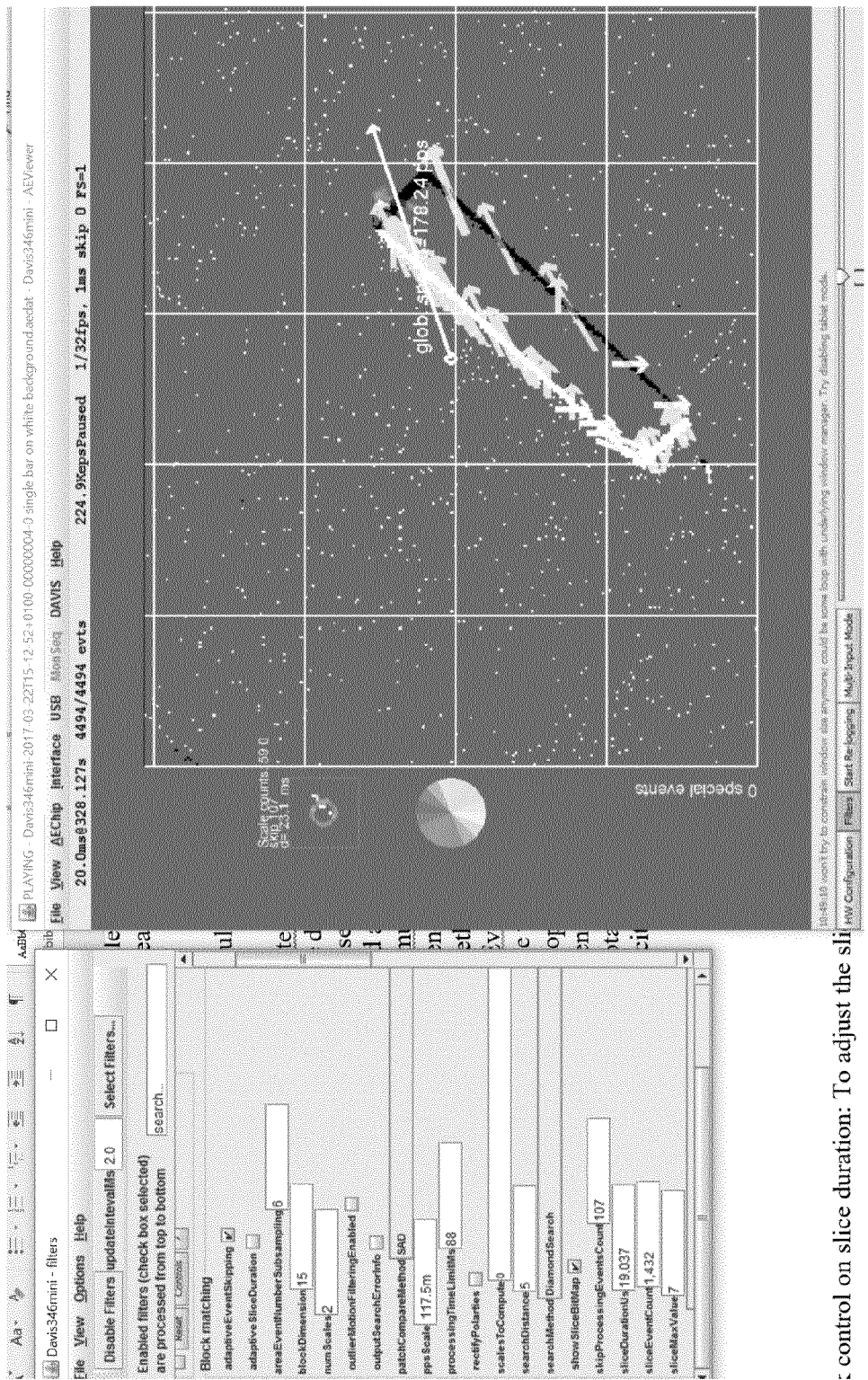
FIG. 8 shows AreaEventCount partitioning of the image space for counting event accumulation for slice rotation.

A practical method for addressing this problem is called AreaEventNumber. Here the entire sensor pixel array is subdivided into coarse blocks. A 2D memory array A tracks the event count per block. A is zeroed after the slice rotation. When any element of A accumulates K events, the slices are rotated and the rotation time d is recorded to allow computation of velocity. An example of this area block arrangement is shown in FIG. 8. Here the image area has been partitioned into array A with areaEventNumberSubsampling 6, meaning $2^6 \times 2^6$=64×64 pixel areas. As soon as any subarea (element of A) accumulates 1432 events (as shown in the software GUI for sliceEventCount property), then the slices are rotated/interchanged. The last slice interval computed by this method was d=21 ms in this example.

By using the AreaEventNumber method, slice rotation/interchanging is data driven by the accumulation of change events, but the method adapts the slice durations to match the fastest moving area of the scene. This adaptation prevents under-sampling that causes motion too large to match between slices.

The hardware cost of AreaEventNumber is similar to normal slice accumulation. It is almost the same as accumulation into a coarse sub-sampled slice, except that event polarity can be ignored and the area memory registers must be wide enough to accommodate the much larger maximum event counts K that typically takes values from 1 k-10 k events in practice. However, these wider registers are much more than offset by the much smaller number of elements.

For example in FIG. 8, only 5×5×16=400 bits form A compared with the 346×260×4=360 k bits of full resolution slice memory using multibit slice value of 4 bits. Thus A requires 90 times less memory that the slice memory.

Feedback control on slice duration: Another method to automatically adjust the slice time duration or event number according to different scenes is possible via feedback control. In this embodiment, an optical flow distribution histogram is created to measure the accuracy of current slice parameter. The histogram's weighted average match distance D is calculated. If the D is larger than r/2, it means that the time slice is too long, and so the slice duration or event number is decreased. Otherwise, if the average match distance is less than r/2, then it indicates the slices are too brief in duration, and the slice duration or event number is increased. This feedback control method can be improved by using additional policy steps to ensure stability. Otherwise it is possible that very long slice durations may result in OF results of very small matching distance that are solely the result of a bias in the search algorithms towards zero motion (small match distance). In practice, stability can be ensured by limiting the slice duration range within application-specific limits.

The Java code snippet below shows specific steps of one implementation of this algorithm.

1900, the event number is manually reduced to a small value, resulting in very small match distance. Again it returns to the steady state value. This data shows the stability of the event number control in data that has a large variation in average speed.

To improve the accuracy, an outlier rejection is employed according to a further embodiment of the present invention to filter out events with poor matching quality. Particularly, two parameters are used to reject the outliers.

One parameter is denoted as validPixOccupancy; this parameter determines the percentage of valid pixels in two blocks that will be compared. Valid pixels mean the pixels where change events were accumulated. The reason for setting this parameter is that sometimes the blocks are too sparse, which makes the distance metric get a meaningless result. By just calculating the blocks that are filled with sufficient valid pixels, we can reject the misleading results. OF matching distance results are set to a maximum value if either reference block or search block has insufficient occupancy.

Another outlier rejection parameter is called confidenceThreshold. The minimum distance (the similarity) between the reference block and the candidate block should be smaller (larger) than the confidenceThreshold, otherwise the OF event will be considered as an outlier and will be

```
private void adaptSliceDuration( ) {
    {
        // measure last hist to get control signal on slice duration
        // measures avg match distance.
        float radiusSum = 0;
        int countSum = 0;
        final int totSD = searchDistance << (numScales - 1);
        for (int xx = -totSD; xx <= totSD; xx++) {
            for (int yy = -totSD; yy <= totSD; yy++) {
                int count = resultHistogram[xx + totSD][yy + totSD];
                if (count > 0) {
                    final float radius = (float) Math.sqrt((xx * xx) + (yy * yy));
                    countSum += count;
                    radiusSum += radius * count;
                }
            }
        }
        if (countSum > 0) {
            avgMatchDistance = radiusSum / (countSum); // compute average match
distance from reference block
        }
            switch (sliceMethod) {
                case ConstantDuration:
                    int     durChange    =    (int)    (errSign    *
adapativeSliceDurationProportionalErrorGain * sliceDurationUs);
                    setSliceDurationUs(sliceDurationUs + durChange);
                    break;
                case ConstantEventNumber:
                case AreaEventNumber:
                    setSliceEventCount(Math.round(sliceEventCount    *    (1    +
adapativeSliceDurationProportionalErrorGain * errSign)));
            }    }
    }
```

Figure 9:
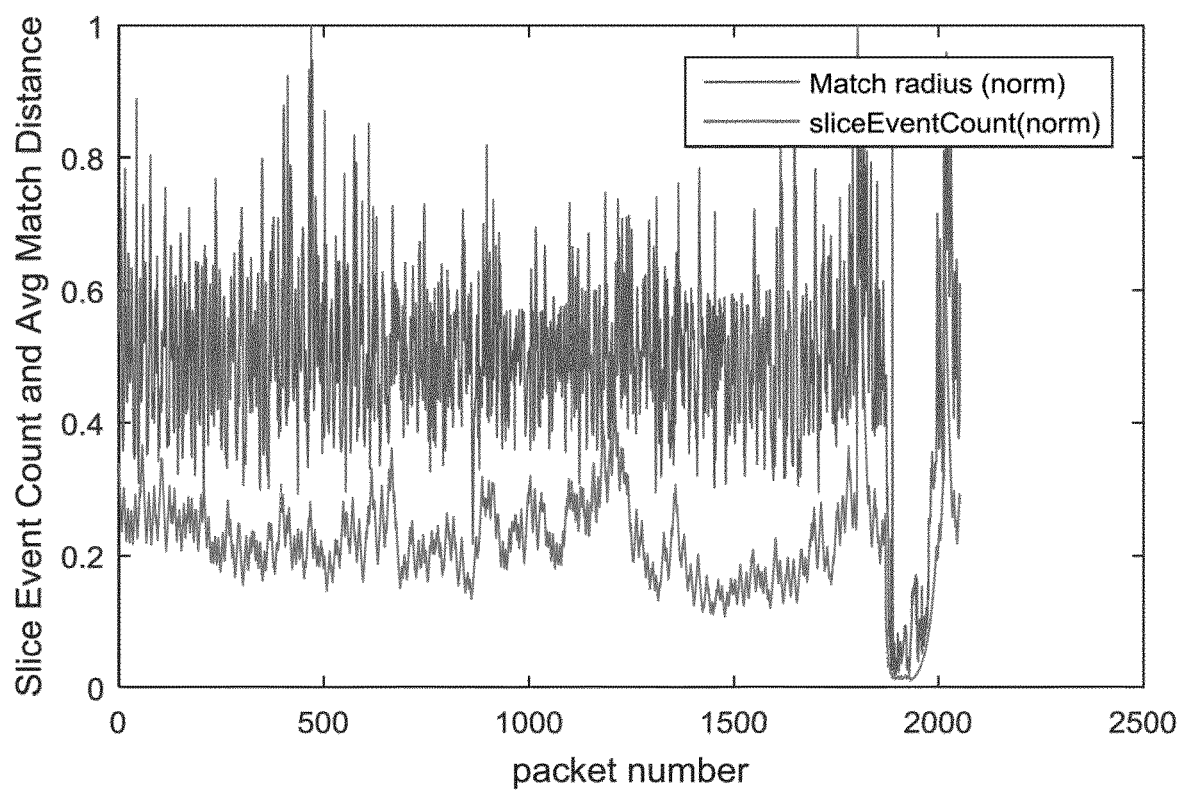
FIG. 9 shows an event number control.

The data in FIG. 9 shows an example of event number control using the AreaEventNumber feedback control method using areas of 64×64 pixels. The scene had a large range of speeds over time. The blue trace shows the average OF match distance. The feedback control of event number holds the average match distance at its (normalized) average value of about 0.5. The orange trace shows the event number. The event number has a steady state (normalized) value of about 0.23. Around packet 1800, the event number was manually perturbed to a large value, resulting in a decrease in average match distance. The event number rapidly returns to the steady state value. At around packet rejected. Thus, the best matching search block may actually be a poor match, and the confidenceThreshold allows rejecting best matches if the match distance is too large.

Figure 10:
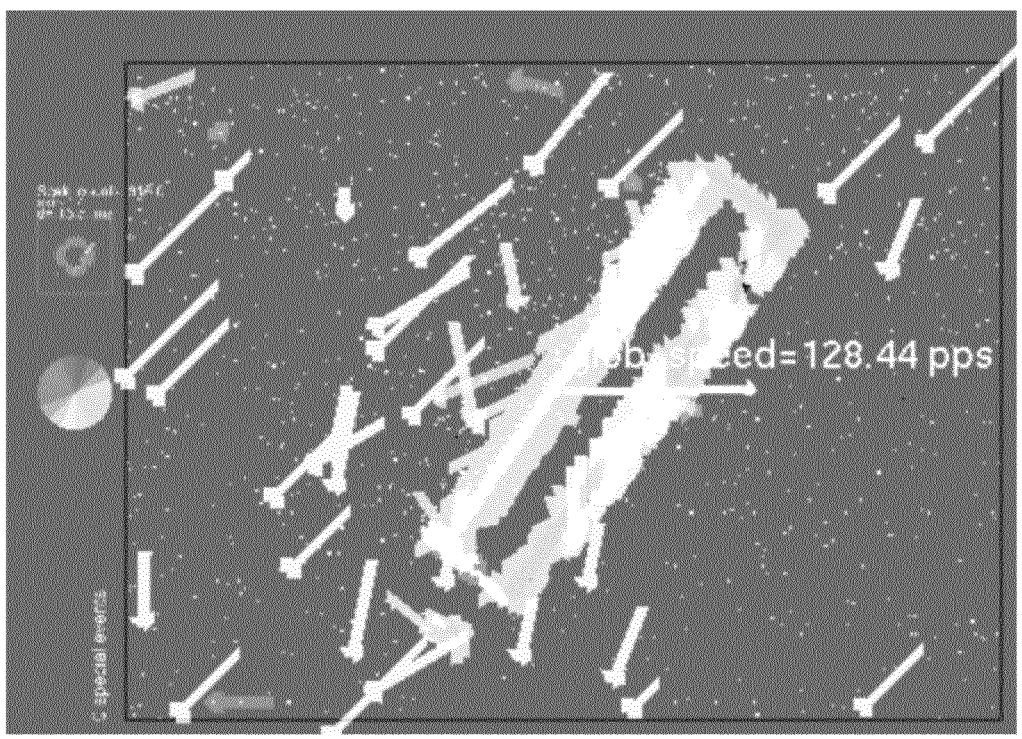
FIG. 10 shows an example of outlier rejection using confidenceThreshold and validPixOccupancy. (A): without outlier rejection; (B): using outlier rejection.
Figure 10:

The effect of these parameters is shown in example data depicted in FIG. 10 from a simple case of a black bar moving up and to the right. The flow results are visibly cleaner using these outlier rejection criteria.

Both outlier rejection mechanisms are easily implemented in hardware. For example, according to an embodiment, the valid pixel occupancy can be realized by pixel subtraction units that output a large value if both operands are zero. The confidence threshold can be realized by a comparator on the final best match output result that flags a distance that is too large.

Further, it is not necessary to process every incoming change event for optical flow. The change events collected in the current time slice are indicators to where there is new visual data. They are not actually used for computing matching except to set the reference block center location. Thus it is possible to accumulate these events to the current time slice but skip processing flow for these events if the hardware or software is busy processing previous events or a time budget for processing an event packet has been exceeded.

According to an embodiment, an adaptive event skipping has therefore been implemented. Here, the parameter called skipProcessingEventCount is used to store the event number that has been skipped. This number is changed adaptively. The event skipping algorithm is designed as follows:
1. The average frame per second (FPS) is calculated from the application.
2. If the achieved FPS is too low, then the skipProcessingEventCount is increased. Otherwise if the achieved FPS is sufficiently high, then skipProcessingEventCount is increased.
3. Also, a maximum value of skipProcessingEventCount is set to not miss too many events and information.

This event skipping algorithm decreases the event processing time dramatically, thus allowing software real time performance even in a relatively inefficient software implementation.

In hardware, one implementation of event skipping is shown in FIG. 7. Change events are processed when the OF software or hardware block is available. The change event is always accumulated to the time slice memories (in this case 3 of them since the example uses 3 scales) while the OF unit processes the event it is working on. A memory arbiter is not necessary, since the current change event is accumulated to the current slice t, while the OF block only accesses the most recent change event address (to know where to center its search) and the past t−d and t−2*d time slices.

According to a further embodiment of the present invention, the optical flow motion field can be filtered.

Here, the raw OF events output from the method can be accumulated onto a regularly-spaced, optionally subsampled motion field (MF). This MF filters multiple OF events over space and time to reduce noise and impose constraints, for example MF smoothness. There are many methods for regularizing such MFs. A basic implementation according to an embodiment of the present invention is described here. It reduces noise in the OF output, at the cost of increased time delay (from low pass temporal filtering) and lower spatial resolution (from subsampling and diffusion). A benefit for conventional processing is the representation as a regularly-spaced MF grid.

The following Java code snippet shows MF processing. This method takes an OF event with location x,y, velocity vector vx,vy, and (precomputed) speed. It updates the motion field array value. Optional algorithm flags allow
1. an optional periodic decay of the MF values towards zero flow,
2. an optional consistency check to only add the OF event if it is consistent with existing MF value (e.g. by checking if dot product of OF and MF vectors is positive, indicating they point in the same direction),
3. a low pass filtering step that updates the MF value towards the OF value with an adjustable time constant,
4. and an optional diffusion step that averages the MF value with its neighbors.

```
/**
 * updates motion field
 *
 * @param timestamp in us
 * @param x1 location pixel x before subsampling
 * @param y1
 * @param vx flow vx, pps
 * @param vy
 */
synchronized public void update(int timestamp, int x, int y, float vx, float vy, float speed) {
    int dtDecay = timestamp - lastDecayTimestamp;
    if (decayTowardsZeroPeridiclly && dtDecay > motionFieldTimeConstantMs * 1000 || dtDecay < 0) {
        decayAllTowardsZero(timestamp);
        lastDecayTimestamp = timestamp;
    }
    int x1 = x >> motionFieldSubsamplingShift, y1 = y >> motionFieldSubsamplingShift;
    if (x1 < 0 || x1 >= velocities.length || y1 < 0 || y1 >= velocities[0].length) {
        return;
    }
    if (checkConsistent(timestamp, x1, y1, vx, vy)) {
        velocities[x1][y1].filter(vx, vy, speed, timestamp);
        if (motionFieldDiffusionEnabled) {
            // diffuse by average of neighbors and ourselves
            int n = 0;
            float dvx = 0, dvy = 0, dvs = 0;
            for (int dx = -1; dx <= 1; dx++) {
                int x2 = x1 + dx;
                if (x2 >= 0 && x2 < velocities.length) {
                    for (int dy = -1; dy <= 1; dy++) {
                        int y2 = y1 + dy;
                        if (dx == 0 && dy == 0) {
                            continue; // don't count ourselves
                        }
                        if (y2 >= 0 && y2 < velocities[0].length) {
                            n++;
```

```
                Point3D p = velocities[x2][y2].getValue3D( );
                dvx += p.x;
                dvy += p.y;
                dvs += p.z;
            }
        }
    }
}
float r = 1f / n; // recip of sum to compute average
LowpassFilter3D v = velocities[x1][y1];
Point3D c = v.getValue3D( );
v.setInternalValue3D(.5f * (c.x + r * dvx), .5f * (c.y + r * dvy), .5f * (c.z + r * dvs));
        }
    }
    lastTs[x1][y1] = ts;
}
```

According to a further embodiment of the present invention the block matching is used for stereo vision matching.

The apparatus and methods described for optical flow can very easily be applied to the closely related problem of stereo binocular vision. In optical flow, a reference block is matched over a search area to a past time slice. In stereo vision, a reference block from one eye is matched over a search curve defined by so-called epipolar lines to the same time slice from the other eye.

For stereo vision, the simplest embodiment of the algorithm/method according to the present invention uses one of the slice rotation/interchanging methods described previously (e.g. Constant Duration, Constant Event Number, or AreaEvent Number) to simultaneously rotate the slices from both eyes. If one of the event number methods is used, then the rotation/interchanging can be triggered by accumulation by either eye.

The optical flow and stereo methods can be combined, since both depend only on accumulated time slices and block matching. Both stereo matching and optical flow computations can be triggered by events accumulated into the current time slice from either eye.

Examples of enhanced Optical Flow algorithms/methods according to the present invention FIG. 11 shows real DVS data examples of block matching for various types of image features. Here, red are reference block slice pixels, while green are search area slice pixels, and blue pixels show matched block pixels. (A): edge. (B): Corner. (C): isolated feature. (D): texture.

FIG. 12, FIG. 13, FIG. 14, and FIG. 15 show examples of the improved flow method results described above.

In the following further aspects and embodiments of the present invention are stated as items but may also be formulated as claims of the present invention.

Item 1: An apparatus or method for computing optical flow from event-based vision sensors uses
a. Time slice accumulated event count 2D image memories t, t−d, and t−2*d
b. Accumulation of event counts into current time slice event count memory t.
c. Matching reference block centered on most recent event location in slice t in past time slice t−d to search area in time slice t−2*d using a minimum block image distance matching criterion.
d. Periodically rotating time slice memories so that current slice t becomes slice t−d, slice t−d becomes slice t−2*d, and slice t−2*d is cleared and becomes slice t.

Item 2: Item 1 plus block matching distance matching metric that is sum of absolute differences between reference block pixels and search block pixels.

Item 3: Item 1 plus using multiple sets of time slice memories that subsample the original address space of the sensor.

Item 4: Item 1 plus a method of rotating time slices at constant time interval.

Item 5: Item 1 plus a method of rotating time slices at constant total event count accumulated into slice t.

Item 6: Item 1 plus a method of rotating time slices when any sub area of slice t accumulates a specified number of events.

Item 7: Item 1 plus a method of rotating time slices when the total integrated motion since the last slice rotation exceeds a threshold amount.

Item 8: Item 1 plus a method of controlling the slice rotation interval duration based on feedback control from the average match distance.

Item 9: Item 1 plus a method of controlling the slice's total event count based on feedback control from the average match distance.

Item 10: Item 1 plus a method of controlling the slice based on feedback control from the average match distance when any sub block of slice t accumulates a specified number of events.

Item 11: Item 1 plus a method of accumulating event count 2D images to binary map.

Item 12: Item 1 plus a method of accumulating event count 2D images to multibit map.

Item 13: Item 1 plus a method of searching the full area exhaustively.

Item 14: Item 1 plus a method of Diamond Search.

Item 15: Item 1 plug using block's valid pixel percentage to reject outliers.

Item 16: Item 1 plus using a distance threshold to reject outliers.

Item 17: Item 1 plus using an event down-sampling that skips fully processing some events, while still accumulating them to current time slice to improve the real-time performance.

Item 18: Item 17 plus a method of controlling the skip event number based on feedback control from the average frame per second.

Item 19: Item 1 plus a method to accumulate the events onto a regularly-spaced, optionally sub-sampled motion field Item 20: Item 2 plus Item 4 plus a logic circuit implementation of calculating blocks' sum of absolute distances in parallel Item 21: Item 2 plus 14 plus a logic circuit implementation of calculating minimum sum of absolute distance in parallel Item 22: An apparatus or method for computing stereo from event-based vision sensors uses
a. Time slice accumulated event count 2D image memories t(r), (t−d)(r), t(l), (t−d)(l) from right (r) and left (l) eyes
b. Accumulation of event counts into current time slice event count memories t(r) and t(l).
c. Matching reference block centered on most recent event location in slice t(r) in slice (t−d)(r) to search area in time slice (t−d)(l) using a minimum block image distance matching criterion, and vice versa for events from left eye to right eye.
d. Periodically and simultaneously rotating time slice memories so that current slice t(r) becomes slice (t−d)(r), slice t(l) becomes slice (t−d)(l), and slices t(r) and t(l) are cleared.

Item 23: Item 22 plus one or any of the features of item 1 to 21.

REFERENCES

[1] Baker S, Matthews I. Lucas-kanade 20 years on: A unifying framework[J]. International journal of computer vision, 2004, 56(3): 221-255.
[2] Horn B K P, Schunck B G. Determining optical flow[J]. Artificial intelligence, 1981, 17(1-3): 185-203.
[3] Benosman R, Clercq C, Lagorce X, et al. Event-based visual flow[J]. IEEE transactions on neural networks and learning systems, 2014, 25(2): 407-417.
[4] R. Benosman, S.-H. Ieng, C. Clercq, C. Bartolozzi, and M. Srinivasan, Asynchronous frameless event-based optical flow, Neural Networks, vol. 27, pp. 32-37, 2012.
[5] Conradt J. On-board real-time optic-flow for miniature event-based vision sensors.//2015 IEEE International Conference on Robotics and Biomimetics (ROBIO). IEEE, 2015: 1858-1863.
[6] Barranco F, Fermuller C, Aloimonos Y. Bio-inspired motion estimation with event-driven sensors[C]. International Work-Conference on Artificial Neural Networks. Springer International Publishing, 2015: 309-321.
[7] Rueckauer B, Delbruck T. Evaluation of event-based algorithms for optical flow with ground-truth from inertial measurement sensor[J]. Frontiers in neuroscience, 2016, 10.
[8] "jAER Open Source Project," jAER Open Source Project. [Online]. Available: http://jaerproject.org.
[9] Agha S, Dwayer V M. Algorithms and VLSI Architectures for MPEG-4 Motion Estimation[J]. Electronic systems and control Division Research, 2003: 24-27.
[10] https://sourceforge.net/p/jaer/codeHEAD/tree/jAER/trunk/src/ch/unizh/ini/jaer/projects/minliu/PatchMatchFlow.java.
[11] Wong S, Vassiliadis S, Cotofana S. A sum of absolute differences implementation in FPGA hardware[C], Euromicro Conference, 2002. Proceedings. 28th. IEEE, 2002: 183-188.
[12] Lichtsteiner P, Posch C, Delbruck T. A 128×128 120 dB 15 us latency asynchronous temporal contrast vision sensor[J]. IEEE journal of solid-state circuits, 2008, 43(2): 566-576.
[13] Berner R, Delbruck T, Civit-Balcells A, et al. A 5 Meps \$100 USB2.0 address-event monitor-sequencer interface [C].//2007IEEE International Symposium on Circuits and Systems. IEEE, 2007: 2451-2454.
[14] Barjatya A. Block matching algorithms for motion estimation[J]. IEEE Transactions Evolution Computation, 2004, 8(3): 225-239.
[15] Zhang L, Zhang Y, Tang J, et al. Binary code ranking with weighted hamming distance[C]//Proceedings of the IEEE Conference on Computer Vision and Pattern Recognition. 2013: 1586-1593.

The invention claimed is:

1. A method for computing optical flow in a scene captured by an event-based vision sensor which comprises a plurality of pixels and is configured to output a stream of change events, wherein each change event corresponds to a change in brightness detected by one of the pixels and comprises a timestamp, a pixel address of the pixel that detected said change in brightness, and a parameter describing a sign of said brightness change,
wherein change events are accumulated in at least three time slice frames, namely a first current time slice frame (t) starting at time t, a second time slice frame (t−d) starting at time t−d, and a third time slice frame (t−2*d) starting at time t−2*d, wherein d is a duration of the respective time slice frame,
wherein change events are accumulated over said duration d into the current first time slice frame,
wherein a reference block of the second time slice frame (t−d), which reference block comprises pixels centered on the pixel of the most recent change event in the current first time slice frame (t), is compared to search blocks in the third time slice frame (t−2*d) to find a search block most similar to the reference block using a distance metric,
wherein the three time slice frames (t, t−d, t−2*d) are periodically interchanged so that the current first time slice frame (t) becomes the second time slice frame (t−d), the second time slice frame (t−d) becomes the third time slice frame (t−2*d), and the third time slice frame (t−2*d) is cleared and becomes the current first time slice frame (t), and
wherein said interchanging of said time slice frames is conducted when any sub area of the current first time slice (t) accumulates a specified number of change events.

2. The method according to claim 1, wherein said distance metric is the sum of absolute differences between reference block pixels and search block pixels.

3. The method according to claim 1, wherein multiple sets of time slice frames are used that subsample an original address space of the event-based vision sensor.

4. The method according to claim 1, wherein said interchanging of said time slice frames is conducted at constant time interval.

5. The method according to claim 1, wherein said interchanging of said time slice frames is conducted at a certain, particularly constant, total event count accumulated into the first time slice frame (t).

6. The method according to claim 1, wherein said interchanging of said time slice frames is conducted when a total integrated motion of the scene since the last interchanging of said time slice frames exceeds a threshold amount.

7. The method according to claim 1, wherein said duration d after which said interchanging of said time slice frames is controlled depending on an average match distance (D) between the reference block and the respective most similar search block, which average match distance is determined using a histogram of the calculated optical flow distribution.

8. The method according to claim 1, wherein said first, second and third time slice frames each form a binary bitmap time slice frame.

9. The method according to claim 1, wherein said first, second and third time slice frames each form a multibit pixel time slice frame.

10. The method according to claim 1, wherein the respective third time slice frame is searched exhaustively to find said most similar search block.

11. The method according to claim 1, wherein a Diamond Search is used to find said most similar search block.

12. The method according to claim 1, wherein only those reference and search blocks are compared that comprise a sufficient pre-defined number of valid pixels in order to reject outliers, wherein a valid pixel is a pixel at which a change event has been accumulated.

13. The method according to claim 1, wherein said most similar search block is rejected as an outlier in case a distance between the reference block and said most similar search block exceeds a distance threshold.

14. The method according to claim 1, wherein some of said most recent change events are accumulated into the current first time slice but are skipped and thereby not used for centering of a reference block to improve the real-time performance.

15. The method according to claim 1, wherein an optical flow event comprising a pixel location (x,y), a velocity vector (vx, vy), and particularly a speed in the direction of the velocity vector, is calculated from the respective reference block and most similar search block.

16. The method according to claim 1, wherein the sum of absolute distances between a reference block and a search block is calculated in parallel.

17. The method according to claim 1, wherein the minimum sum of absolute distances is calculated in parallel.

18. A method for computing stereo vision from a left and a right event-based vision sensor (l, r), wherein each event-based vision sensor (l, r) comprises a plurality of pixels and is configured to output a stream of change events, wherein each change event corresponds to a change in brightness detected by one of the pixels and comprises a timestamp, a pixel address of the pixel that detected said change in brightness, and a parameter describing a sign of said brightness change, wherein for each vision sensor (l, r) change events are accumulated in at least two time slice frames, namely a first current time slice frame (t(l), t(r)) starting at time t, respectively, and a second time slice frame ((t−d)(l), (t−d)(r)) starting at time t−d, respectively, wherein change events of the left vision sensor (l) are accumulated over said duration d into the current first time slice frame (t(l)) of the left vision sensor (l), and wherein change events of the right vision sensor (r) are accumulated over said duration d into the current first time slice frame (t(r)) of the right vision sensor (r), wherein a reference block of the second time slice frame ((t−d)(r)) of the right vision sensor (r), which reference block comprises pixels centered on the pixel of the most recent change event in the current first time slice frame (t(r)) of the right vision sensor (r), is compared to search blocks in the second time slice frame ((t−d)(l)) of the left vision sensor (l) to find a search block most similar to the reference block using a distance metric, and wherein a further reference block of the second time slice frame ((t−d)(l)) of the left vision sensor (l), which further reference block comprises pixels centered on the pixel of the most recent change event in the current first time slice frame (t(l)) of the left vision sensor (l), is compared to further search blocks in the second time slice frame ((t−d)(r)) of the right vision sensor (r) to find a further search block most similar to the further reference block using the distance metric, and wherein the four time slice frames (t(l), t(r), (t−d)(l), (t−d)(r)) are periodically and simultaneously interchanged so that the current first time slice frame (t(l)) of the left vision sensor (l) becomes the second time slice frame ((t−d)(l)) of the left vision sensor (l), the first time slice frame (t(r)) of the right vision sensor (r) becomes the second time slice frame ((t−d)(r)) of the right vision sensor (r), and the first time slice frames (t(l), t(r)) of the left and right vision sensor (l, r) are cleared.

19. An apparatus for computing stereo vision comprising a left and a right event-based vision sensor (l, r) for capturing a scene, respectively, wherein each event-based vision sensor (l, r) comprises a plurality of pixels and is configured to output a stream of change events, wherein each change event corresponds to a change in brightness detected by one of the pixels and comprises a timestamp, a pixel address of the pixel that detected said change in brightness, and a parameter describing a sign of said brightness change, wherein the apparatus is configured to accumulate change events for each vision sensor (l, r) in at least two time slice frames, namely a first current time slice frame (t(l), t(r)) starting at time t, respectively, and a second time slice frame ((t−d)(l), (t−d)(r)) starting at time t−d, respectively, wherein the apparatus is further configured to accumulate change events of the left vision sensor (l) over said duration d into the current first time slice frame (t(l)) of the left vision sensor (l), and wherein the apparatus is further configured to accumulate change events of the right vision sensor (r) over said duration d into the current first time slice frame (t(r)) of the right vision sensor (r), wherein the apparatus is further configured to compare a reference block of the second time slice frame ((t−d)(r)) of the right vision sensor (r), which reference block comprises pixels centered on the pixel of the most recent change event in the current first time slice frame (t(r)) of the right vision sensor (r), to search blocks in the second time slice frame ((t−d)(l)) of the left vision sensor (l) to find a search block most similar to the reference block using a distance metric, and wherein the apparatus is further configured to compare a further reference block of the second time slice frame ((t−d)(l)) of the left vision sensor (l), which further reference block comprises pixels centered on the pixel of the most recent change event in the current first time slice frame (t(l)) of the left vision sensor (l), to further search blocks in the second time slice frame ((t−d)(r)) of the right vision sensor (r) to find a further search block most similar to the further reference block using the distance metric, and wherein the apparatus is further configured to periodically and simultaneously interchange the four time slice frames (t(l), t(r), (t−d)(l), (t−d)(r)) so that the current first time slice frame (t(l)) of the left vision sensor (l) becomes the second time slice frame ((t−d)(l)) of the left vision sensor (l), the first time slice frame (t(r)) of the right vision sensor (r) becomes the second time slice frame ((t−d)(r)) of the right vision sensor (r), and the first time slice frames (t(l), t(r)) of the left and right vision sensor (l, r) are cleared.

20. A method for computing optical flow in a scene captured by an event-based vision sensor which comprises a plurality of pixels and is configured to output a stream of change events, wherein each change event corresponds to a change in brightness detected by one of the pixels and comprises a timestamp, a pixel address of the pixel that detected said change in brightness, and a parameter describing a sign of said brightness change, wherein change events are accumulated in at least three time slice frames, namely a first current time slice frame (t) starting at time t, a second time slice frame (t−d) starting at time t−d, and a third time slice frame (t−2*d) starting at time t−2*d, wherein d is a duration of the respective time slice frame, wherein change events are accumulated over said duration d into the current first time slice frame, wherein a reference block of the second time slice frame (t−d), which reference block comprises pixels centered on the pixel of the most recent change event in the current first time slice frame (t), is compared to search blocks in the third time slice frame (t−2*d) to find a search block most similar to the reference block using a distance metric, wherein the three time slice frames (t, t−d, t−2*d) are periodically interchanged so that the current first time slice frame (t) becomes the second time slice frame (t−d), the second time slice frame (t−d) becomes the third time slice frame (t−2*d), and the third time slice frame (t−2*d) is cleared and becomes the current first time slice frame (t), and wherein said interchanging of said time slice frames is conducted when a total integrated motion of the scene since the last interchanging of said time slice frames exceeds a threshold amount.

21. A method for computing optical flow in a scene captured by an event-based vision sensor which comprises a plurality of pixels and is configured to output a stream of change events, wherein each change event corresponds to a change in brightness detected by one of the pixels and comprises a timestamp, a pixel address of the pixel that detected said change in brightness, and a parameter describing a sign of said brightness change, wherein change events are accumulated in at least three time slice frames, namely a first current time slice frame (t) starting at time t, a second time slice frame (t−d) starting at time t−d, and a third time slice frame (t−2*d) starting at time t−2*d, wherein d is a duration of the respective time slice frame, wherein change events are accumulated over said duration d into the current first time slice frame, wherein a reference block of the second time slice frame (t−d), which reference block comprises pixels centered on the pixel of the most recent change event in the current first time slice frame (t), is compared to search blocks in the third time slice frame (t−2*d) to find a search block most similar to the reference block using a distance metric, wherein the three time slice frames (t, t−d, t−2*d) are periodically interchanged so that the current first time slice frame (t) becomes the second time slice frame (t−d), the second time slice frame (t−d) becomes the third time slice frame (t−2*d), and the third time slice frame (t−2*d) is cleared and becomes the current first time slice frame (t), and wherein said duration d after which said interchanging of said time slice frames is controlled depending on an average match distance (D) between the reference block and the respective most similar search block, which average match distance is determined using a histogram of the calculated optical flow distribution.

\* \* \* \* \*